US008730966B2

(12) United States Patent
Awano

(10) Patent No.: US 8,730,966 B2
(45) Date of Patent: May 20, 2014

(54) ANONYMIZATION USING ANONYMIZING DEVICE AND PACKET SERVER IN WHICH ANONYMOUS ADDRESS IS GENERATED BASED ON PREFIX ACQUIRED FROM SERVER

(75) Inventor: Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 13/254,950

(22) PCT Filed: Feb. 19, 2010

(86) PCT No.: PCT/JP2010/001110
§ 371 (c)(1),
(2), (4) Date: Sep. 6, 2011

(87) PCT Pub. No.: WO2010/100850
PCT Pub. Date: Sep. 10, 2010

(65) Prior Publication Data
US 2012/0057595 A1       Mar. 8, 2012

(30) Foreign Application Priority Data

Mar. 6, 2009    (JP) ................................. 2009-052919

(51) Int. Cl.
*H04L 12/28*          (2006.01)
(52) U.S. Cl.
USPC ........................................................ 370/392
(58) Field of Classification Search
USPC ................. 370/389, 392, 393, 252, 229, 230;
709/230, 236; 713/150, 153, 160, 189,
713/190
See application file for complete search history.

(56) References Cited

U.S. PATENT DOCUMENTS

| 8,464,334 | B1* | 6/2013 | Singhal .......................... 726/13 |
| 2003/0037235 | A1* | 2/2003 | Aziz et al. ..................... 713/160 |

FOREIGN PATENT DOCUMENTS

| JP | 2003-78551 A | 3/2003 |
| JP | 2003-298657 A | 10/2003 |
| JP | 2004-242142 A | 8/2004 |
| JP | 2005-79921 A | 3/2005 |
| JP | 2006-5606 A | 1/2006 |
| JP | 2007-189752 A | 7/2007 |
| JP | 2008-98802 A | 4/2008 |
| WO | 2008/069100 A1 | 6/2008 |

OTHER PUBLICATIONS

International Search Report for PCT/JP2010/001110 mailed May 11, 2010.
T. Narten et al., "Privacy Extensions for Stateless Address Autoconfiguration in IPv6", Network Working Group, RFC 3041, Jan. 2001.
International Search Report of PCT Application No. PCT/JP2010/001110 mailed May 11, 2010.

* cited by examiner

*Primary Examiner* — Anh Ngoc Nguyen
(74) *Attorney, Agent, or Firm* — Sughrue Mion, PLLC

(57) ABSTRACT

A communication system (1) includes an anonymizing device (100) and a server (200). The anonymizing device (100) generates an anonymous address based on a prefix acquired from the server (200), receiving a packet transmitted from a communication node (300), rewrites a source address of the received packet into an anonymous address, encapsulates the received packet, and sends the packet to a second network (600) using the address of the anonymizing device (100) as a source address of the encapsulated packet and the address of the server (200) as a destination address. Then, receiving the encapsulated packet transmitted from the anonymizing device (100), the server (200) decapsulates the encapsulated packet and sends the packet to the second network (600). High anonymity can be thereby assured.

26 Claims, 27 Drawing Sheets

ANONYMIZATION POLICY TABLE

| No | DESTINATION ADDRESS | SOURCE ADDRESS | DESTINATION PORT | SOURCE PORT | PROTOCOL | NECESSITY OF ANONYMIZATION |
|---|---|---|---|---|---|---|
| 1 | Sv_ADR1 | any | 80 | any | TCP | Yes |
| 2 | Sv_ADR2 | any | 443 | any | TCP | Yes |
| 3 | Sv_ADR3 | any | 80 | any | TCP | Yes |
| 4 | any | any | any | any | TCP | No |

Fig. 3

SESSION MANAGEMENT TABLE

| No | DESTINATION ADDRESS | SOURCE ADDRESS | ANONYMOUS ADDRESS | DESTINATION PORT | SOURCE PORT | PROTOCOL | ANCHOR SERVER ADDRESS | EXPIRATION TIME |
|---|---|---|---|---|---|---|---|---|
| 1 | Sv_ADR1 | Cl_ADR1 | An_ADR1 | 80 | 10100 | TCP | Anch_ADR1 | expire_time1 |
| 2 | Sv_ADR2 | Cl_ADR1 | An_ADR2 | 443 | 10105 | TCP | Anch_ADR2 | expire_time2 |
| 3 | Sv_ADR2 | Cl_ADR1 | An_ADR3 | 80 | 10210 | TCP | Anch_ADR1 | expire_time3 |

Fig. 4

PREFIX INFORMATION TABLE EXAMPLE IN ANONYMIZING DEVICE

| ANCHOR SERVER ADDRESS | PREFIX SET NUMBER | PREFIX (PREFIX LENGTH) | IID Key | ASSIGNMENT STATUS | ASSIGNMENT END TIME | EXPIRATION TIME |
|---|---|---|---|---|---|---|
| Anch_ADR1 | 1 | Pref_A1 (64) | Key_A1 | Y | - | expire_time_A1 |
| | | Pref_A2 (64) | Key_A2 | Y | - | expire_time_A2 |
| | | Pref_A3 (64) | Key_A3 | N | asgn_timeA3 | expire_time_A3 |
| Anch_ADR2 | 5 | Pref_B9 (64) | Key_B9 | N | asgn_timeB1 | expire_time_B1 |
| | | Pref_B10 (64) | Key_B10 | Y | - | expire_time_B2 |

Fig. 5

LENDING PREFIX TABLE

| PREFIX SET NUMBER | PREFIX | IID Key |
|---|---|---|
| 1 | Pref_A1 (64) | Key_A1 |
| | Pref_A2 (64) | Key_A2 |
| | Pref_A3 (64) | Key_A3 |
| 2 | Pref_A4 (64) | Key_A4 |
| | Pref_A5 (64) | Key_A5 |
| | Pref_A6 (64) | Key_A6 |
| 3 | Pref_A7 (64) | Key_A7 |
| | Pref_A8 (64) | Key_A8 |
| | Pref_A9 (64) | Key_A9 |

Fig. 7

TRANSFER TABLE

| No. | ANONYMOUS ADDRESS | ANONYMIZING DEVICE ADDRESS | EXPIRATION TIME |
|---|---|---|---|
| 1 | An_ADR1 | CPE_ADR1 | expire_time1 |
| 2 | An_ADR2 | CPE_ADR1 | expire_time2 |
| 3 | An_ADR3 | CPE_ADR1 | expire_time3 |

Fig. 8

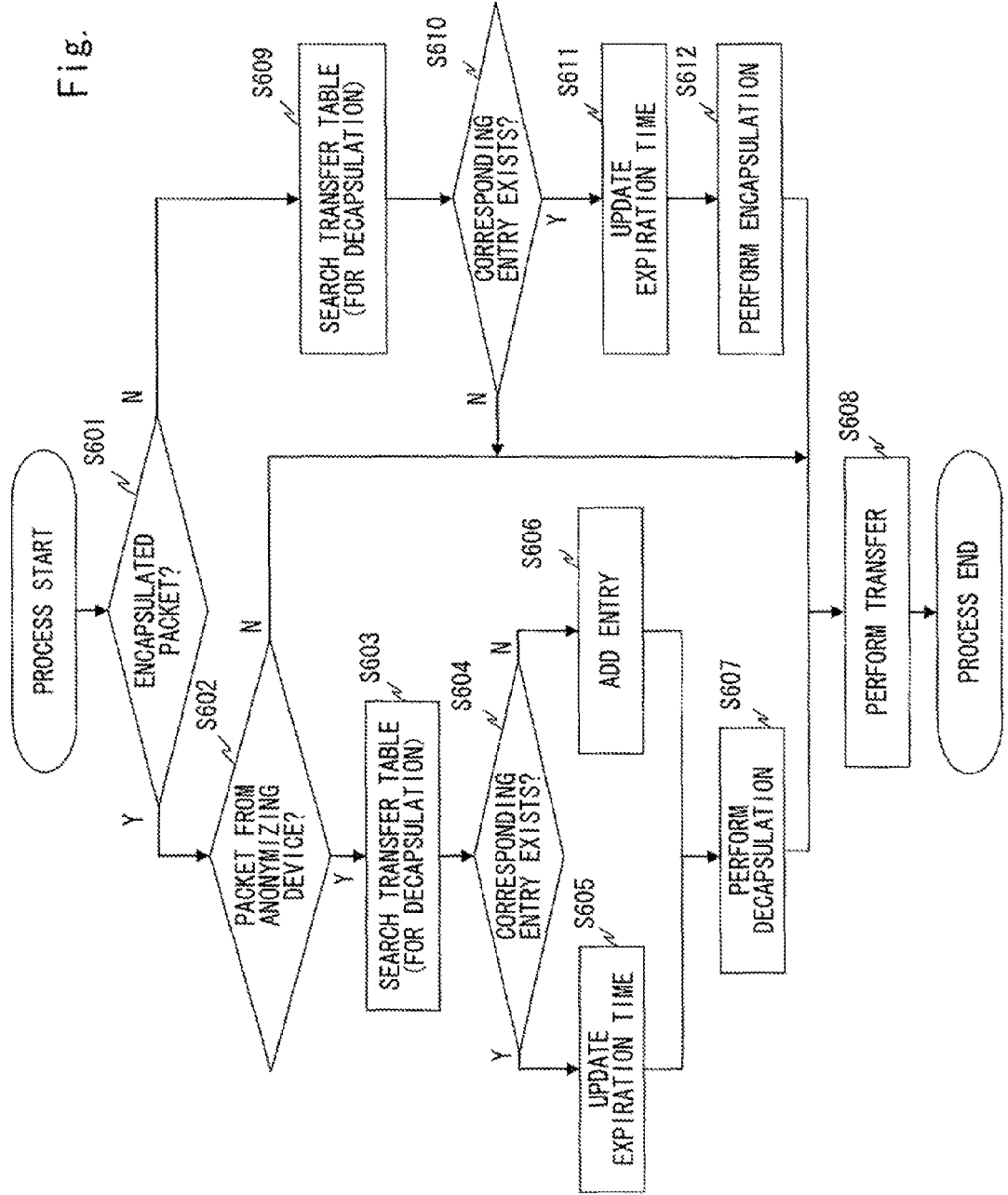

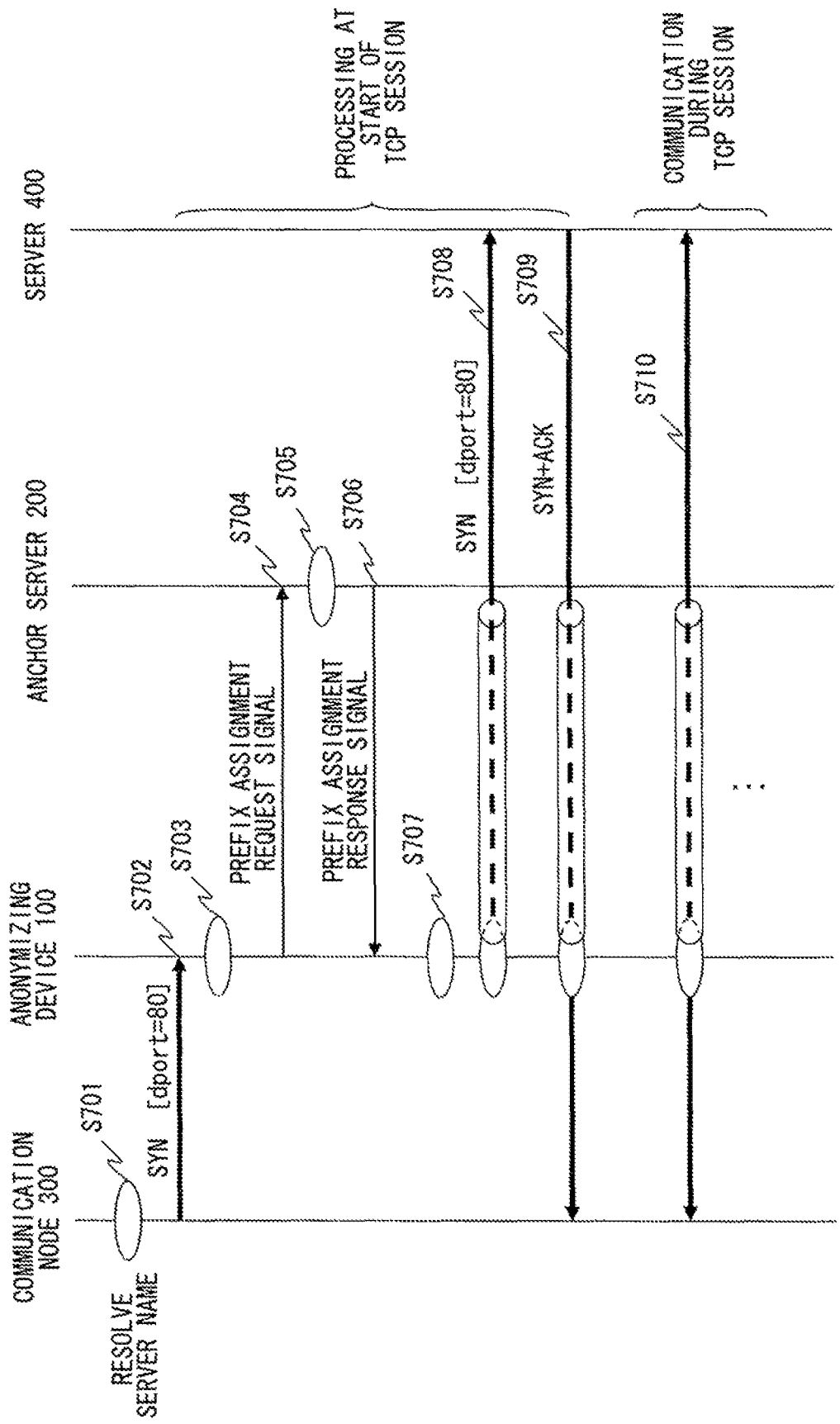

PREFIX INFORMATION TABLE EXAMPLE IN ANONYMIZING DEVICE

| ANCHOR SERVER ADDRESS | PREFIX SET NUMBER | PREFIX (PREFIX LENGTH) | IID Key | ASSIGNMENT STATUS | ASSIGNMENT END TIME | EXPIRATION TIME |
|---|---|---|---|---|---|---|
| Anch_ADR1 | 1 | Pref_A1 (64) | Key_A1 | Y | - | expire_time_A1 |
|  |  | Pref_A2 (64) | Key_A2 | Y | - | expire_time_A2 |
|  |  | Pref_A3 (64) | Key_A3 | N | asgn_timeA3 | expire_time_A3 |
|  | 2 | Pref_A4 (64) | Key_A4 | N | - | expire_time_A4 |
|  |  | Pref_A5 (64) | Key_A5 | N | - | expire_time_A5 |
|  |  | Pref_A6 (64) | Key_A6 | N | - | expire_time_A6 |
| Anch_ADR2 | 5 | Pref_B9 (64) | Key_B9 | N | asgn_timeB1 | expire_time_B1 |
|  |  | Pref_B10 (64) | Key_B10 | Y | - | expire_time_B2 |

Fig. 16

SESSION MANAGEMENT TABLE

| No | DESTINATION ADDRESS | SOURCE ADDRESS | ANONYMOUS ADDRESS | DESTINATION PORT | SOURCE PORT | PROTOCOL | ANCHOR SERVER ADDRESS | EXPIRATION TIME |
|---|---|---|---|---|---|---|---|---|
| 1 | Sv_ADR1 | Cl_ADR1 | An_ADR1 | 80 | 10100 | TCP | Anch_ADR1 | expire_time1 |
| 2 | Sv_ADR2 | Cl_ADR1 | An_ADR2 | 443 | 10105 | TCP | Anch_ADR2 | expire_time2 |
| 3 | Sv_ADR2 | Cl_ADR1 | An_ADR3 | 80 | 10210 | TCP | Anch_ADR1 | expire_time3 |
| 4 | Sv_ADR1 | Cl_ADR1 | An_ADR4 | 80 | 20000 | TCP | Anch_ADR1 | expire_time4 |

Fig. 17

TRANSFER TABLE

| No. | ANONYMOUS ADDRESS | ANONYMIZING DEVICE ADDRESS | EXPIRATION TIME |
|---|---|---|---|
| 1 | An_ADR1 | CPE_ADR1 | expire_time1 |
| 2 | An_ADR2 | CPE_ADR1 | expire_time2 |
| 3 | An_ADR3 | CPE_ADR1 | expire_time3 |
| 4 | An_ADR4 | CPE_ADR1 | expire_time4 |

Fig. 18

SESSION MANAGEMENT TABLE

| No | DESTINATION ADDRESS | SOURCE ADDRESS | DESTINATION PORT | SOURCE PORT | PROTOCOL | ANCHOR SERVER ADDRESS | EXPIRATION TIME |
|---|---|---|---|---|---|---|---|
| 1 | Sv_ADR1 | Cl_ADR1 | 80 | 10100 | TCP | Anch_ADR1 | expire_time1 |
| 2 | Sv_ADR2 | Cl_ADR1 | 443 | 10105 | TCP | Anch_ADR2 | expire_time2 |
| 3 | Sv_ADR2 | Cl_ADR1 | 80 | 10210 | TCP | Anch_ADR1 | expire_time3 |

Fig. 21

SESSION MANAGEMENT TABLE

| No | DESTINATION ADDRESS | SOURCE ADDRESS | ANONYMOUS ADDRESS | DESTINATION PORT | SOURCE PORT | PROTOCOL | ANONYMIZING DEVICE ADDRESS | EXPIRATION TIME |
|---|---|---|---|---|---|---|---|---|
| 1 | Sv_ADR1 | Cl_ADR1 | An_ADR1 | 80 | 10100 | TCP | CPE_ADR1 | expire_time1 |
| 2 | Sv_ADR2 | Cl_ADR1 | An_ADR2 | 443 | 10105 | TCP | CPE_ADR2 | expire_time2 |
| 3 | Sv_ADR2 | Cl_ADR1 | An_ADR3 | 80 | 10210 | TCP | CPE_ADR1 | expire_time3 |

Fig. 22

PREFIX INFORMATION TABLE IN ANONYMIZING DEVICE

| PREFIX | IID Key |
|---|---|
| Pref_A1 | Key_A1 |
| Pref_A2 | Key_A2 |
| Pref_A3 | Key_A3 |
| Pref_A4 | Key_A4 |
| Pref_A5 | Key_A5 |

ANONYMIZATION USING ANONYMIZING DEVICE AND PACKET SERVER IN WHICH ANONYMOUS ADDRESS IS GENERATED BASED ON PREFIX ACQUIRED FROM SERVER

TECHNICAL FIELD

The present invention relates to a communication method, a communication system, an anonymizing device and a server that perform communication using IP (Internet Protocol), and, particularly, to a communication method, a communication system, an anonymizing device and a server that can assure the anonymity of a communication node even when communication is performed using a unique address in the entire network based on IPv6 (Internet Protocol Version 6).

BACKGROUND ART

IPv4 address exhaustion becomes a real possibility today, and the shift to IPv6 is soon to be a reality. While the IPv4 address space has 32 bits, the IPv6 address space has an extensive address space of 128 bits. Therefore, in IPv6, IPv6 addresses which are unique over the global range can be assigned to all nodes. There is thus no need to share one public IPv4 address among a plurality of nodes using NAT (Network Address Translation) as in IPv4. Therefore, in IPv6, each node can achieve end-to-end communication. This matches the original design concept of the Internet, bringing significant advantages. For example, there is an advantage that it is possible to easily implement P2P applications for which various schemes have been required to go beyond the NAT.

There is also a disadvantage. In communication using IPv6, an address assigned to each node gets known to the other end of communication. Further, in an IPv6 address generated using the address autoconfiguration of IPv6, the low-order 64 bits are used for an MAC (Media Access Control) address of NIC (Network Interface Card). Furthermore, the low-order 64 bits of the IPv6 address which are used for the MAC address are used for a long term and in a fixed manner. As a result, there is a high risk that the communication history of a user of a communication node is traced, which raises a serious issue in anonymity assurance.

Further, in communication using NAT, the address of a node which performs communication is concealed from the other end of communication. For example, when access is made from a node to a Web server, the Web server can get to know the address of NAT assigned to the WAN (Wide Area Network) side, it cannot get to know the address of a LAN (Local Area Network) under NAT. In many cases, an address on the WAN side is assigned to a broadband router distributed to each home. Therefore, although it is possible to identify a home as a communication source at the point of time by knowing the address on the WAN side, the address on the WAN side is temporary, and it varies at various occasions such as upon reboot of a broadband router having NAT. Therefore, it is unable to trace the communication of a specific node for a long term.

To address the issue of anonymity assurance, specifications that generates low-order 64 bits of an IPv6 address randomly without using an MAC address and further modifies them at regular intervals are published (Non Patent Literature 1: RFC3041, "Privacy Extensions for Stateless Address Autoconfiguration in IPv6").

However, in the technique based on the specifications disclosed in Non Patent Literature 1, a prefix part, which is high-order 64 bits of IPv6, is left unmodified. The prefix, the high-order 64 bits of IPv6, is assigned to a broadband router distributed to a home, for example, and advertised to a communication node connected to a LAN under the broadband router. As a result, the communication node generates an IPv6 address in which the received prefix is placed at the high-order 64 bits and performs communication using the generated IPv6 address.

When the prefix of IPv6 is not modified for a long period, there is a risk that a communication source is identified at a home. The case where there is such a risk is similar to the case where NAT is used in the current IPv4; however, the address on the WAN side of NAT is modified at various occasions in IPv4.

In the case of IPv6, because the address of a communication node connected to a LAN is generated using a prefix, modification of the prefix involves modification of the address of the communication node in the LAN. Therefore, a problem arises if the prefix is modified at regular intervals like the address on the WAN side of NAT in IPv4. As a result, a fixed prefix is used for a long term in IPv6, and the issue of anonymity is more serious compared with the case of IPv4.

Further, in IPv6, P2P applications are expected to increase continuously in the future, and the opportunities when users directly get to know the address of a communication node used by each user will also increase, which makes the issue of anonymity more important. Therefore, a higher level of anonymity is required in IPv6 than in IPv4.

Further, a problem also arises when a communication node in a LAN automatically modifies its address including a prefix part. The reason is that, because the prefix part is used for routing of an IPv6 packet, modification of the prefix part results in a failure to route the packet addressed to the communication node to a network to which the communication node is connected.

An example of a technique of achieving address modification including the prefix part is disclosed in Patent Literature 1. Hereinafter, an operation in the communication system according to Patent Literature 1 is described briefly. As shown in FIG. 27, the communication system according to Patent Literature 1 is made up of a transmitting-side information processing device p10 (address=2·7FFFF0·6E9A), a tentative address server p20 (address=5·5FFFF0·000), and a receiving-side information processing device p30 (address=2·7FFFF0·639A), which are connected through the Internet p40.

The transmitting-side information processing device p10 acquires a tentative address (5·5FFFF0·0001) from the tentative address server p20 and uses the acquired tentative address as a source address when transmitting a packet. Thus, the transmitting-side information processing device p10 transmits a transmission packet (dst=2·7FFFF0·639A, srt=5·5FFFF0·0001 (tentative address)) to the receiving-side information processing device p30.

The receiving-side information processing device p30 receives the packet transmitted from the transmitting-side information processing device p10 and sends a response to the source address (5·5FFFF0·0001). Because this address is an address having a prefix part to be routed to the tentative address server p20, the tentative address server p20 receives the response packet. Thus, the tentative address server p20 receives the received packet (dst=5·5FFFF0·0001 (tentative address), src=2·7FFFF0·639A) from the receiving-side information processing device p30.

When the tentative address server p20 assigns a tentative address to the transmitting-side information processing device p10, the tentative address server p20 stores the correspondence between the real address (2·7FFFF0·6E9A) of the transmitting-side information processing device p10 and the tentative address (5·5FFFF0·0001) which has been lent, and, using the stored information, gets to know that the packet transmitted from the receiving-side information processing device p30 is a packet to be transmitted to the transmitting-side information processing device p10. As a result, the tentative address server p20 modifies the destination address of the packet received from the receiving-side information processing device p30 to the real address of the transmitting-side information processing device p10 and modifies the source address thereof to the address (5·5FFFF0·0000) of the tentative address server p20, and then sends out the packet to the Internet p40.

Finally, the packet transmitted from the tentative address server p20 is routed to the transmitting-side information processing device p10, and the transmitting-side information processing device p10 receives it. According to the method described above, the transmitting-side information processing device p10 can modify the address including the prefix part. Thus, the transmitting-side information processing device p10 receives the received packet (dst=2·7FFFF0·6E9A, src=5·5FFFF0·0000 (tentative address server)) from the tentative address server p20.

Further, as other related art, a server device that includes a tunnel server having a function of creating an anonymous address and a tunneling function in Mobile IPv6 is disclosed in Patent Literature 2. A user management method that configures a global IPv6 address by combining IF-ID and Ipv6 address prefix in an IPv6 access network is disclosed in Patent Literature 3. A communication device that calculates an interface ID of a terminal based on a digest value of a hash function and generates a source address using the calculated interface ID of the terminal is disclosed in Patent Literature 4.

CITATION LIST

Patent Literature

Patent Literature 1: Japanese Unexamined Patent Application Publication No. 2007-189752
Patent Literature 2: Japanese Unexamined Patent Application Publication No. 2003-298657
Patent Literature 3: Japanese Unexamined Patent Application Publication No. 2004-242142
Patent Literature 4: Japanese Unexamined Patent Application Publication No. 2005-079921

Non Patent Literature

Non Patent Literature 1: RFC3041 "Privacy Extensions for Stateless Address Autoconfiguration in IPv6"

SUMMARY OF INVENTION

Technical Problem

However, the communication system according to Patent Literature 1 has the following problems.
(Problem 1)
The source address when the transmitting-side information processing device p10 transmits a packet is different from the prefix of the network to which the transmitting-side information processing device p10 is connected. A router placed between the transmitting-side information processing device p10 and the Internet p40 discards such a packet transmitted from the transmitting-side information processing device p10 in terms of security in some cases (the filtering processing is called ingress filtering), and, in such a case, the transmitting-side information processing device p10 cannot perform communication.
(Problem 2)
As described above, the source address and the destination address of a packet transmitted from the transmitting-side information processing device p10 and the destination address and the source address of a packet transmitted as a response from the receiving-side information processing device p30 are different addresses. In a protocol that establishes a connection such as TCP (Transmission Control Protocol), a connection is established using the address and port pair at both endpoints (the transmitting-side information processing device p10 and the receiving-side information processing device p30). Therefore, in the communication system according to Patent Literature 1, the addresses at both endpoints of a packet at transmission and reception do not match, and it is unable to perform communication using TCP. TCP is used by majority upper protocols such as HTTP (Hypertext Transfer Protocol) and FTP (File Transfer Protocol). Therefore, the inability to perform communication using TCP means that those majority upper protocols are unavailable.
(Problem 3)
In the communication system according to Patent Literature 1, the transmitting-side information processing device p10 needs to have special functions such as a function of acquiring and returning a tentative address and a function of selecting an address to be used as a source address of a transmission packet. Currently, the proliferation of devices having IPv6 function has already begun. Such devices include a PC (Personal Computer) with Windows Vista (registered trademark) on board, for example. With this being the situation, it is extremely difficult to apply a scheme that requires special functions on the communication node side. Further, although it is possible to use a specific application to support the scheme, the significance of assuring anonymity is low if it is not applicable to existing applications used with high frequency, such as Web browsers.
(Problem 4)
Even in the case where a Web browser that applies the communication system according to Patent Literature 1 exists, some recent Web services perform a plurality of communications concurrently in parallel. In such a Web service, a plurality of tentative IPv6 addresses are assigned to the transmitting-side information processing device p10. In this case, the transmitting-side information processing device p10 needs to conduct DAD (Duplicate Address Detection), a procedure to detect duplicate addresses, each time acquiring a new address, which raises a problem in terms of a load, a communication response, a network band use efficiency and the like. Further, another communication node connected to the same network is also required to store information of the plurality of addresses assigned to the transmitting-side information processing device p10 in a cache, which causes an increase in load.

The present invention has been accomplished in view of the above problems, and an object of the present invention is thus to provide a communication method, a communication system, an anonymizing device and a server that can assure high anonymity for communication using an existing application without need for modification of a communication node itself.

Solution to Problem

A communication system according to a first exemplary aspect of the invention includes an anonymizing device connected to a communication node through a first network, and a server connected to the anonymizing device through a second network. The anonymizing device includes an anonymous address generation means for generating an anonymous address based on a prefix acquired from the server, and a packet processing means for, upon receiving a packet transmitted from the communication node, rewriting a source address of the received packet into the anonymous address, encapsulating the received packet, and sending the encapsulated packet to the second network, using an address of the anonymizing device as a source address of the encapsulated packet and an address of the server as a destination address thereof. The server includes a transfer means for, upon receiving the encapsulated packet transmitted from the anonymizing device, decapsulating the encapsulated packet and sending the decapsulated packet to the second network.

A communication system according to a second exemplary aspect of the invention includes an anonymizing device connected to a communication node through a first network, and a server connected to the anonymizing device through a second network. The anonymizing device includes a packet processing means for, upon receiving a packet transmitted from the communication node, encapsulating the received packet, and sending the encapsulated packet to the second network, using an address of the anonymizing device as a source address of the encapsulated packet and an address of the server as a destination address thereof. The server includes an anonymous address generation means for generating an anonymous address based on a prefix, and a packet processing means for, upon receiving the encapsulated packet transmitted from the anonymizing device, decapsulating the encapsulated packet, rewriting a source address of the decapsulated packet into the anonymous address, and sending the decapsulated packet to the second network, using an address of the anonymizing device as the source address of the decapsulated packet.

A communication method according to a third exemplary aspect of the invention is a communication method in a communication system including an anonymizing device connected to a communication node through a first network, and a server connected to the anonymizing device through a second network. The anonymizing device includes an anonymous address generation means for generating an anonymous address based on a prefix acquired from the server, and a packet processing means for, upon receiving a packet transmitted from the communication node, rewriting a source address of the received packet into the anonymous address, encapsulating the received packet, and sending the encapsulated packet to the second network, using an address of the anonymizing device as a source address of the encapsulated packet and an address of the server as a destination address thereof. The server includes a transfer means for, upon receiving the encapsulated packet transmitted from the anonymizing device, decapsulating the encapsulated packet and sending the decapsulated packet to the second network.

A communication method according to a fourth exemplary aspect of the invention is a communication method in a communication system including an anonymizing device connected to a communication node through a first network, and a server connected to the anonymizing device through a second network. The anonymizing device includes a packet processing means for, upon receiving a packet transmitted from the communication node, encapsulating the received packet, and sending the encapsulated packet to the second network, using an address of the anonymizing device as a source address of the encapsulated packet and an address of the server as a destination address thereof. The server includes an anonymous address generation means for generating an anonymous address based on a prefix, and a packet processing means for, upon receiving the encapsulated packet transmitted from the anonymizing device, decapsulating the encapsulated packet, rewriting a source address of the decapsulated packet into the anonymous address, and sending the decapsulated packet to the second network, using an address of the anonymizing device as the source address of the decapsulated packet.

An anonymizing device according to a fifth exemplary aspect of the invention includes an anonymous address generation means for generating an anonymous address based on a prefix acquired from a server connected through a second network upon receiving a packet transmitted from a communication node connected through a first network, and a packet processing means for rewriting a source address of the packet transmitted from the communication node into the anonymous address, encapsulating the packet, and sending the encapsulated packet to the second network, using an address of the anonymizing device as a source address of the encapsulated packet and an address of the server as a destination address thereof.

A server according to a sixth exemplary aspect of the invention includes an anonymous address generation means for generating an anonymous address based on a prefix upon receiving a packet transmitted from a communication node connected to an anonymizing device through a first network, the packet being encapsulated by the anonymizing device and transmitted through a second network, and a packet processing means for decapsulating the encapsulated packet transmitted from the anonymizing device, rewriting a source address of the decapsulated packet into the anonymous address, and sending the decapsulated packet to the second network, using an address of the anonymizing device as the source address of the decapsulated packet.

A communication system according to a seventh exemplary aspect of the invention includes an anonymizing device connected to a communication node through a first network, and a server connected to the anonymizing device through a second network. The anonymizing device includes a packet processing means for, upon receiving a packet transmitted from the communication node, rewriting a source address of the received packet into an anonymous address acquired from the server, encapsulating the received packet, and sending the encapsulated packet to the second network, using an address of the anonymizing device as a source address of the encapsulated packet and an address of the server as a destination address thereof. The server includes a transfer means for, upon receiving the encapsulated packet transmitted from the anonymizing device, decapsulating the encapsulated packet, and sending the decapsulated packet to the second network.

An anonymizing device according to an eighth exemplary aspect of the invention includes a packet processing means for, upon receiving a packet transmitted from a communication node connected through a first network, acquiring an anonymous address from a server connected through a second network, rewriting a source address of the packet transmitted from the communication node into the acquired anonymous address, encapsulating the packet, and sending the encapsulated packet to the second network, using an address of the anonymizing device as a source address of the encapsulated packet and an address of the server as a destination address thereof.

Advantageous Effects of Invention

According to the present invention, it is possible to provide a communication method, a communication system, an anonymizing device and a server that can assure high anonymity.

BRIEF DESCRIPTION OF DRAWINGS

FIG. 3 is a view showing an anonymization policy table according to the first exemplary embodiment of the present invention;

FIG. 4 is a view showing a session management table according to the first exemplary embodiment of the present invention;

FIG. 5 is a view showing a prefix information table according to the first exemplary embodiment of the present invention;

FIG. 7 is a view showing a lending prefix table according to the first exemplary embodiment of the present invention;

FIG. 8 is a view showing a transfer table according to the first exemplary embodiment of the present invention;

FIG. 14 is a flowchart showing an operation of a packet transfer process in the anchor server according to the first exemplary embodiment of the present invention;

FIG. 15 is a sequence chart showing operations of the anonymizing device and the anchor server according to the first exemplary embodiment of the present invention;

FIG. 16 is a view showing an example of a prefix information table to which a new entry has been added;

FIG. 17 is a view showing an example of a session management table to which a new entry has been added;

FIG. 18 is a view showing an example of a transfer table to which a new entry has been added;

FIG. 21 is a view showing a session management table stored in the anonymizing device according to the second exemplary embodiment of the present invention;

FIG. 22 is a view showing a session management table stored in the anchor server according to the second exemplary embodiment of the present invention;

FIG. 23 is a view showing a prefix information table stored in the anchor server according to the second exemplary embodiment of the present invention;

DESCRIPTION OF EMBODIMENTS

First Exemplary Embodiment

A first exemplary embodiment of the present invention is described hereinafter with reference to the drawings.
(Description of Configuration)

Figure 1:
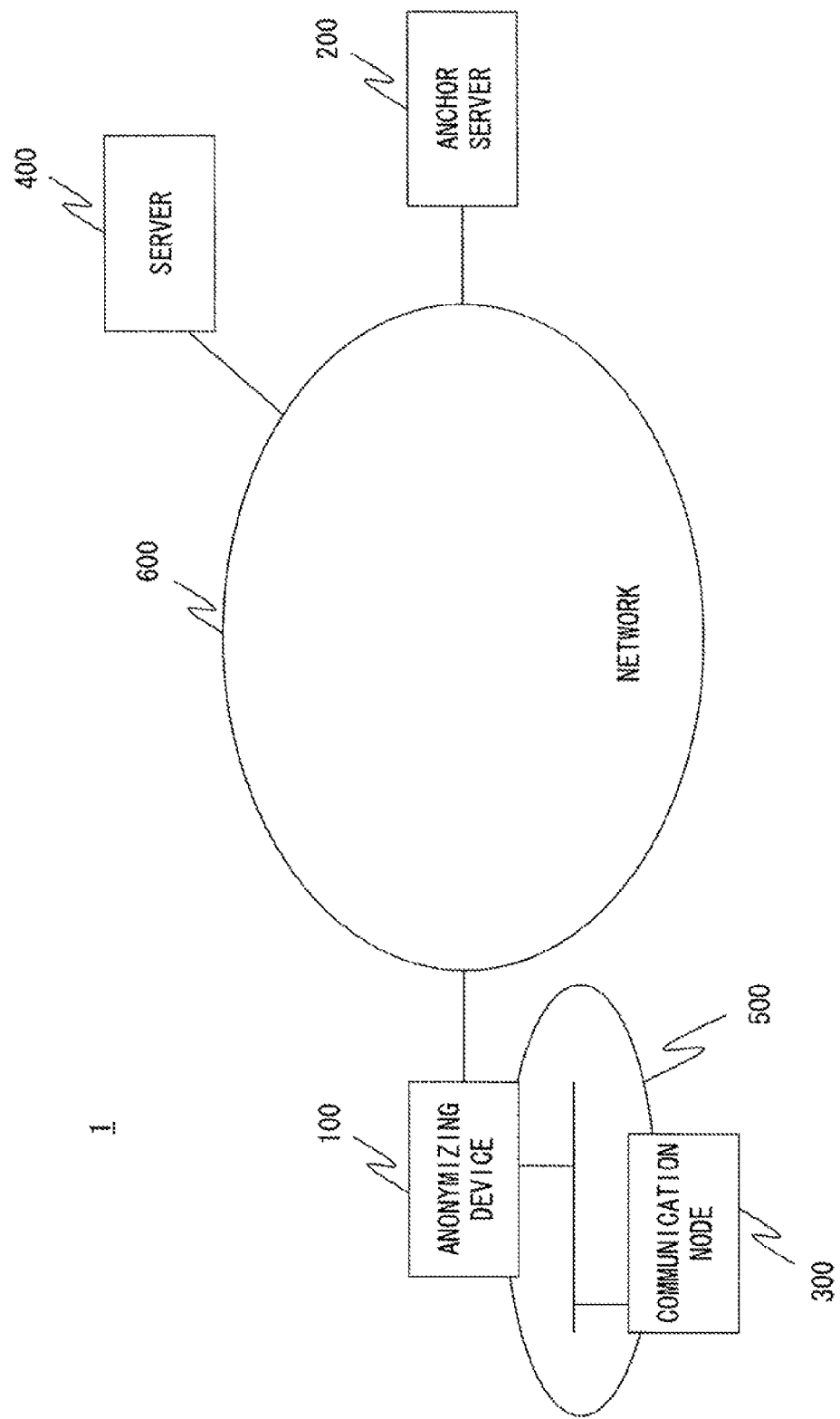
FIG. 1 is a view showing an overall configuration of a communication system according to a first exemplary embodiment of the present invention.

First, a configuration of a communication system 1 according to the first exemplary embodiment is described with reference to FIGS. 1 to 8. FIG. 1 is a view showing an overall configuration of the communication system 1 according to the first exemplary embodiment. The communication system 1 includes an anonymizing device 100, an anchor server 200, a communication node 300, and a server 400. The communication node 300 is connected to the anonymizing device 100 through a local network 500. Further, the anonymizing device 100, the anchor server 200 and the server 400 are connected through a network 600.

The anonymizing device 100 has (A) a function of identifying a session of a received packet, (B) a function of rewriting the source address of the packet into an address generated by selecting one from a set of prefixes acquired from the anchor server 200 on a session-by-session basis, and (C) a function of tunneling the packet to the anchor server 200 which is reachable using the rewritten address. Note that, regarding the communication performed by the communication node 300, a series of communication actions are referred to hereinafter as a session.

Figure 2:
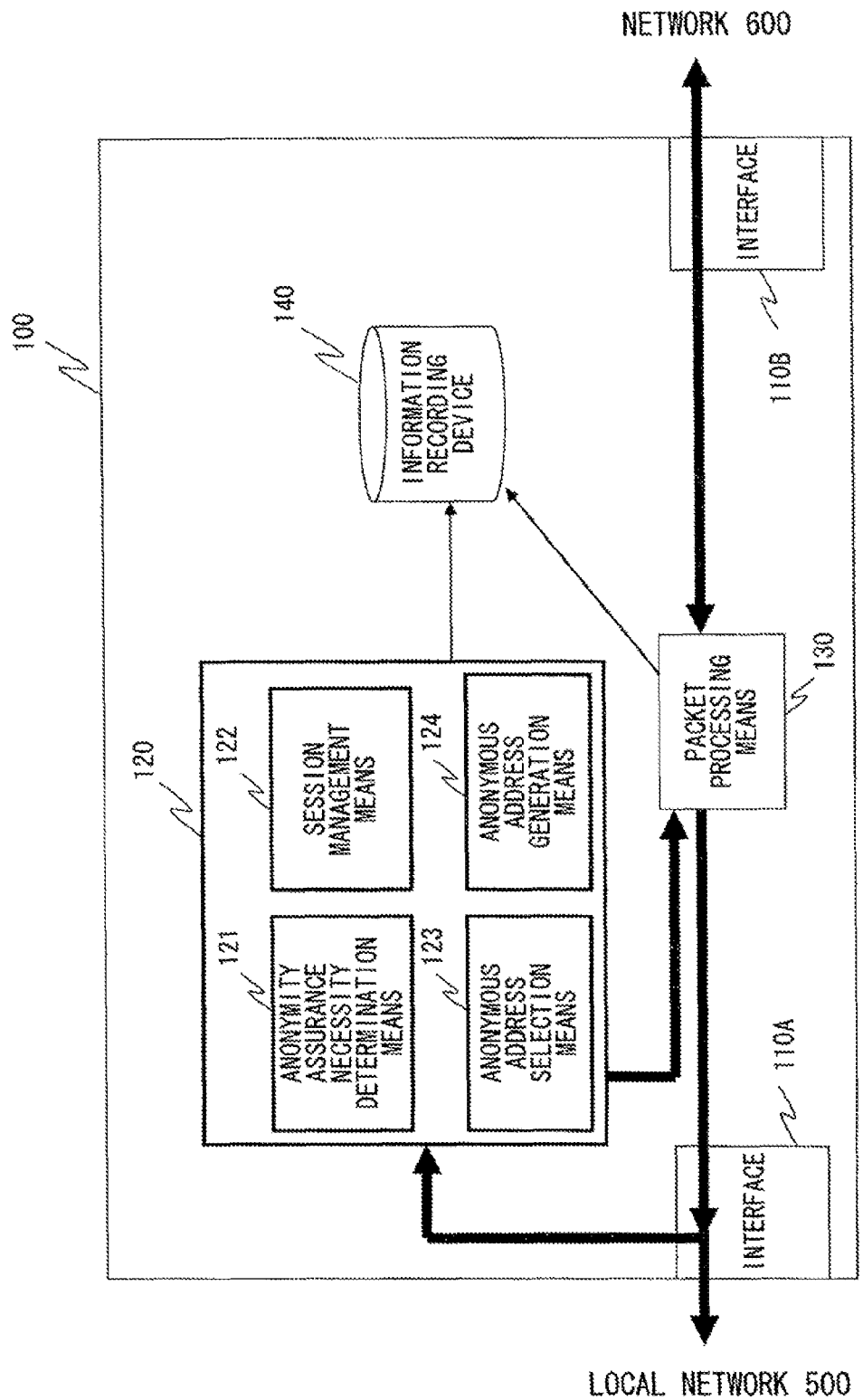
FIG. 2 is a view showing a configuration of an anonymizing device according to the first exemplary embodiment of the present invention.

FIG. 2 is a block diagram showing the anonymizing device 100. As shown in FIG. 2, the anonymizing device 100 includes an interface 110A, an interface 110B, an anonymization control means 120, a packet processing means 130, and an information recording device 140.

The interface 110A is an interface which is connected to the local network 500 for transmitting and receiving packets to and from another node (the communication node 300 etc.) which is connected to the local network 500. A packet that is input from the interface 110A is output to the anonymization control means 120. Further, a packet addressed to a node connected to the local network 500 that is transmitted from the packet processing means 130 is sent out to the local network 500 through the interface 110A.

The interface 110B is an interface which is connected to the network 600 for transmitting and receiving packets to and from another node (the anchor server 200 etc.) which is connected to the network 600. A packet that is input from the interface 110B is output to the packet processing means 130.

Further, a packet addressed to a node connected to the network 600 that is transmitted from the packet processing means 130 is sent out to the network 600 through the interface 110B.

The anonymization control means 120 includes an anonymity assurance necessity determination means 121, a session management means 122, an anonymous address selection means 123, and an anonymous address generation means 124.

The anonymity assurance necessity determination means 121 has a function of reading information of a packet input from the interface 110A and determining whether it is necessary to assure anonymity for the input packet based on the read information. Note that, although a source address, a destination address, a source port number, a destination port number, and a protocol type are used as the information of an input packet in the description of the first exemplary embodiment, other information may be used.

The anonymity assurance necessity determination means 121 has (A) a function of accessing an anonymization policy table recorded in the information recording device 140, (B) a function of determining the necessity of anonymization using the anonymization policy table accessed, and (C) a function of outputting the determined anonymization necessity information to the session management means 122, when determining the necessity of anonymization.

FIG. 3 is a table showing an example of the anonymization policy table. As shown in FIG. 3, the anonymization policy table is a table in which several information contained in a packet and the anonymization necessity information are associated. Although it is assumed that the anonymization policy table is configured in advance by a user, it may be dynamically configured by a node (the anchor server 200 etc.) on the network. Note that, in FIG. 3, "any" in the anonymization policy table indicates that a corresponding item may be any kind, and, at the determination of the necessity of anonymization, evaluation is made sequentially in ascending order of the entry number (No).

The description will continue referring back to FIG. 2. The session management means 122 has a function of determining the start and the end of a session and a function of managing a session management table recorded in the information recording device 140. In the first exemplary embodiment, a TCP session is assumed as the session, and the TCP session is identified based on a destination address, a source address, a destination port number and a source port number. Note that, the session is not limited to the TCP session, another unit may be assumed as the session.

When information indicating that anonymization is necessary is input from the anonymity assurance necessity determination means 121, the session management means 122 conducts a session management process, using the packet input from the interface 110A as a packet for which anonymity is assured. The session management is to determine the start and the end of a session and further performs creation, deletion and update of an entry in the session management table recorded in the anonymous address generation means 124, using an anonymous address generated by the anonymous address selection means 123 and the anonymous address generation means 124. FIG. 4 shows an example of the session management table. The session management process conducted by the session management means 122 is more specifically described hereinbelow.

First, because the TCP session is assumed as the session in the first exemplary embodiment, the session management means 122 can detect the start of the session using a TCP SYN packet.

When the start of the session is detected, the session management means 122 searches the session management table, using information for identifying the TCP session as a search key, to check whether the same session already exists. As a result of search, when the same session does not exist, the session management means 122 determines the start of a new session and makes a request for assigning an anonymous address to the anonymous address selection means 123.

Next, when the session management means 122 acquires a result of the request for anonymous address assignment, an anonymous address, and an address of the anchor server 200 reachable using the anonymous address, the session management means 122 creates a new entry using the destination address, the source address, the destination port number, the source port number and the protocol type extracted from the received packet, the anonymous address, and the address of the anchor server 200 reachable using the anonymous address, and adds the created entry to the session management table. Further, the session management means 122 sets time calculated by adding a predetermined effective time to the current time as expiration time of the added entry.

Then, when the received packet is a packet that belongs to the session which has an entry in the session management table, the session management means 122 updates the expiration time of the corresponding entry. As a method of updating the expiration time, the expiration time after update may be calculated by adding the same effective time as the one used when calculating the first expiration time to the time at which the packet is received or by adding another different time to the time of receipt.

Further, the session management means 122 detects the end of the session and deletes the corresponding entry from the session management table. For example, in the case of the TCP session, the end of the session can be determined by a sequential TCP session termination procedure involving a FIN packet, an ACK+FIN packet and a FIN packet or detection of an RST packet. Although it is necessary to store the arrival of a series of packets when determining the end of the TCP session using the FIN packet and the like, a process of determining the end of the TCP session is a universally applicable common technique, to say nothing of a stack of processing TCP. Therefore, explanation of the detailed configuration and operation of the TCP session end determination process is omitted.

In addition, the session management means 122 monitors the session management table on a regular basis and deletes the entry whose expiration time has past the current time from the session management table.

The description will continue referring back to FIG. 2. When assignment of an anonymous address is requested from the session management means 122, the anonymous address selection means 123 determines a prefix for assuring the anonymity of the address of the communication node 300. Then, based on the determined prefix, the anonymous address selection means 123 requests the anonymous address generation means 124 to generate an anonymous address and thereby acquires the anonymous address. As a response to the request for anonymous address assignment from the session management means 122, the anonymous address selection means 123 sends the anonymous address and the address of the anchor server 200 reachable using the anonymous address back to the session management means 122.

When determining the prefix to serve as a basis for the anonymous address, the anonymous address selection means 123 uses information of a prefix information table recorded in the information recording device 140. The prefix information table is more specifically described hereinbelow.

FIG. 5 is a table showing an example of the prefix information table. As shown in FIG. 5, the prefix information table contains information of an anchor server address, a prefix set number, a prefix, an IID (Interface Identifier) key, an assignment status, an assignment end time, and an expiration time. Note that the prefix information table shown in FIG. 5 is just an example, and it may have a structure containing some of the above items of a structure containing other information. Each information contained in the prefix information table is described hereinbelow.

The anchor server address is the address of the anchor server 200 which is reachable using the anonymous address. Further, the anchor server address is the address of the anchor server 200 from which a prefix to be used when generating an anonymous address is acquired basically. Note that, in the case of distinguishing between the two kinds of addresses of the anchor server 200, each address may be recorded.

Further, although an example in which two addresses of the anchor server 200 are configured in the prefix information table is illustrated in FIG. 5, one address of the anchor server 200 may be configured or more than two addresses of the anchor server 200 may be used. Although a plurality of prefixes may be assigned to the anonymizing device 100 using one anchor server 200, the prefixes to be assigned need to have reachability to the anchor server 200. Therefore, there is a limit to the variation of prefixes which can be provided by one anchor server 200. Further, there is an issue of fault tolerance with one anchor server 200. Therefore, it is preferred to apply a plurality of anchor servers 200 with the objective of assuring higher anonymity and higher fault tolerance.

The prefix set number is a prefix set number which is assigned to a set of prefixes acquired from the anchor server 200. Note that the prefix set number is not always necessary; however, when an already acquired prefix set is presented during assignment of a new prefix set by the anchor server 200, application of the prefix set number enables reduction of the amount of information presented to the anchor server 200 by the anonymizing device 100. In other words, the anonymizing device 100 does not need to notify individual prefixes in the already acquired prefix set to the anchor server 200 and only need to transmit the prefix set number.

The prefix is prefix information acquired from the anchor server 200. Although an anonymous address is generated by the anonymous address generation means 124 by combining the prefix acquired from the anchor server 200 and the IID (Interface Identifier) in the description of the first exemplary embodiment, an anonymous address may be directly acquired from the anchor server 200. In the case of directly acquiring an anonymous address from the anchor server 200, the IID key, which is described below, is not needed. Note that the IPv6 address is a 128-bit address composed of a higher 64-bit prefix part and a lower 64-bit IID part.

The IID key is key information which is used when generating the IID part of the IPv6 address. Note that the detail of a procedure to generate the IID part is described later.

The assignment status indicates whether a prefix has been assigned to a particular session. The assignment status of "Y" indicates that assignment is done, and "N" indicates that assignment is undone.

The assignment end time indicates time when a session ends and a prefix assigned to the session is made open.

The expiration time indicates time when a prefix becomes invalid. When selecting a prefix to be assigned to a particular session, the prefix whose expiration time is time that is in the future relative to the current time is selected. If the prefix is invalidated when the expiration time of the prefix being assigned to a particular session has elapsed, a communication blackout occurs. Therefore, the prefix being assigned to a particular session is not invalidated until the assignment is completed. Note that, when the occurrence of a communication blackout is allowable, the prefix may be invalidated regardless of being assigned or not.

When assignment of an anonymous address is requested from the session management means 122, the anonymous address selection means 123 extracts entries in which the assignment status is "N" (i.e., unassigned) and time set as the expiration time is in the future relative to the current time as selection candidates among the entries recorded in the prefix information table, and selects one appropriate prefix from the selection candidate entries. Note that the detail of a procedure to select an appropriate prefix is described later.

After selecting one appropriate prefix, the anonymous address selection means 123 outputs the selected prefix and the IID key information of the entry to the anonymous address generation means 124 and, as a result, acquires an anonymous address. The acquired anonymous address is sent as a response to the session management means 122. At the same time, the anonymous address selection means 123 updates the entry of the selected prefix to "assigned" (i.e. sets the assignment status to "Y") in the prefix information table. Note that, the prefix acquired from the anchor server 200 may be acquired as an actual 128-bit address, and, in the case of acquiring the prefix as the 128-bit address, the address assigned by the anchor server 200 is sent as it is as a response, without using the function of the anonymous address generation means 124.

Further, the anonymous address selection means 123 has a function of transmitting a prefix request signal for requesting a new prefix to the anchor server 200 when the attempt to select a prefix results in failure to find an appropriate prefix. The prefix assignment request signal contains information presenting prefixes which are managed by the anchor server 200 to which assignment is requested and which are already stored. As the information, the prefix set number is used in consideration of the efficiency of a communication band. Note that, however, individual prefixes may be directly contained without using the prefix set number.

Furthermore, the anonymous address selection means 123 puts the number of prefix sets (or the number of prefixes) requested and the address of the anonymizing device 100 into the prefix assignment request signal. The address of the anonymizing device 100 is not necessarily additionally contained because it is also set to the source address of the prefix assignment request signal, it is contained according to need when an address different from the source address is settable. Further, information other than the above-described information may be contained in the prefix assignment request signal.

When the anonymous address selection means 123 receives a prefix assignment response signal from the anchor server 200 as a response to the prefix assignment request signal, the anonymous address selection means 123 adds an entry to the prefix information table using the information contained in the received prefix assignment response signal.

The prefix assignment response signal contains the assigned prefix set number, the prefixes belonging to the prefix set number, the IID key and the expiration time associated with each prefix, and the address of the anchor server 200. Although the address of the anchor server 200 is not always necessary, it is necessary when the address of the anchor server 200 reachable using the anonymous address and the address of the anchor server 200 as the destination of the prefix assignment request signal are different, for example. Further, information other than the above-described information may be contained in the prefix assignment response signal.

Note that, although it is assumed that the address of the anchor server 200 as the destination of the prefix assignment request signal is preset, it may be acquired using another method. Further, although it is assumed that a plurality of addresses are settable as the address of the anchor server 200, in the case of setting a plurality of addresses, a method that randomly selects one from the plurality of addresses of the anchor server 200 as the anchor server 200 as the destination of the prefix assignment request signal may be adopted, for example.

Note that it is necessary to assure the security such as concealability and perfectibility for the prefix assignment request signal and the prefix assignment response signal. As a means for assuring the security, a common technique such as IPsec may be used.

The description will continue referring back to FIG. 2. The anonymous address generation means 124 has a function of generating an anonymous address in response to a request from the anonymous address selection means 123. The anonymous address generation means 124 sends the generated anonymous address as a response to the anonymous address selection means 123. A procedure to generate an anonymous address which is performed by the anonymous address generation means 124 is described hereinafter by way of illustration. Note that, in the following example, when generating an anonymous address, the anonymous address generation means 124 uses the prefix information and the IID key which are output from the anonymous address selection means 123. Further, the anonymous address generation means 124 also uses the source port number of the packet which is input to the anonymization control means 120.

First, the anonymous address generation means 124 calculates Key using the following Equation 1. Note that, in Equation 1, the IID key is shown as IID_key.

$$\text{Key}=\text{Extract}(n,H(\text{IID\_key},\text{src\_port}|\text{FIXED\_DATA})) \quad \text{(Equation 1)}$$

In Equation 1, H(k,x) indicates processing of performing hashing of data x using key k. As a hash algorithm, HMAC-MD5, HMAC-SHA-1 and the like may be used, for example. Another hash algorithm may be used as a matter of course.

src_port indicates the source port number of a packet. FIXED_DATA indicates arbitrary fixed data. The symbol "|" means joining two data before and after the symbol assuming that the two data are information of byte strings.

Extract(n,x) indicates processing of extracting data of n number of bits from the highest of the data x. The value of n is suitably 128 in the case of applying HMAC-MD5 and 160 in the case of applying HMAC-SHA-1 as the hash algorithm; however, it may be a different value.

In the processing of Equation 1, the value of Key is varied every session (i.e., each time the transmission port number is changed). The processing of Equation 1 is performed so that different anonymous addresses can be generated even in the case of using the same IID Key. Thus, in the case of applying a scheme of updating the IID key separately or the like, the IID key may be used as it is as Key (i.e., Key=IID_key) without performing the calculation of Equation 1.

Next, the anonymous address generation means 124 calculates the IID part (i.e., the lower 64-bit part of the IPv6 address) of an anonymous address using the following Equation 2.

$$\text{DerivedIID}=\text{Extract}(64,E(\text{Key},\text{CPE\_ID})) \quad \text{(Equation 2)}$$

In Equation 2, Key indicates the value calculated in Equation 1. CPE_ID indicates an identifier of the anonymizing device 100. As CPE_ID, use of an identification number or an identification character string which is assigned by an operator of the anchor server 200 is assumed. When an address is assigned to the interface 110B of the anonymizing device 100 by an operator, the assigned address may be used as CPE_ID.

Finally, the anonymous address generation means 124 forms an anonymous address by combining DerivedIID which is calculated using Equation 2 and the prefix information which is output from the anonymous address selection means 123.

The important point is that, when information indicating the correspondence between an anonymous address and the anonymizing device 100 which has assigned the anonymous address does not exist, an operator who administers the anchor server 200 is able to calculate DerivedIID by using information which can be acquired by an administrator of the server 400 such as the anonymous address and the port number (i.e., the information contained in the packet received by the server 400).

As a result, when the communication node 300 that performs anonymous communication using the functions of the anonymizing device 100 and the anchor server 200 makes unauthorized access to the server 400, for example, by notifying the anonymous address which is left in the log of unauthorized access and the source port (in the case of using the source port number) to an operator who administers the anchor server 200 (i.e., provides an anonymity protection service), the operator can identify the anonymizing device 100 to which the communication node 300 which has made unauthorized access is connected.

Therefore, in the communication system 1 according to the first exemplary embodiment, it is possible to assure the anonymity of the communication node 300 and also assure the traceability using the anonymous address (and the source port number) upon occurrence of problems such as unauthorized access.

Note that a method of calculating the anonymous address is not limited to the above-descried method, and the anonymous address may be calculated using another different means. Further, as described above, when the anonymous address can be directly acquired from the anchor server 200, the anonymous address generation means 124 does not need to generate the anonymous address. Further, as a method of calculating the IID part of the anonymous address, the anonymizing device 100 may calculate the IID part by its own without using the information (e.g. IID_key) acquired from the anchor server 200. Thus, in the case where the anonymizing device 100 directly acquires the anonymous address from the anchor server 200, the anonymous address generation means 124 may be eliminated. Further, in the case where the anonymizing device 100 includes the anonymous address generation means 124 and generates anonymous address by its own, only the prefix may be acquired from the anchor server 200, or the prefix and information for generating the IID part (e.g. IID_key) may be acquired therefrom.

The description will continue referring back to FIG. 2. When the packet received by the interface 110A is input through the anonymization control means 120, the packet processing means 130 searches the session management table stored in the information recording device 140, using the destination address, the source address, the destination port number and the source port number of the input packet as a search key. As a result of search, when the corresponding entry is found, the packet processing means 130 performs processing of rewriting the source address of the input packet into the anonymous address set to the retrieved entry.

Then, the packet processing means 130 performs encapsulation of the packet rewritten into the anonymous address. At the encapsulation, the address owned by the anonymizing device 100 is used as the source address of the external IP header, and the address of the anchor server 200 in the retrieved entry is used as the destination address. The encapsulated packet is sent out to the network 600 through the interface 110B. Note that, although the address owned by the anonymizing device 100 is assumed to be the IP address assigned to the interface 110B, it is not limited to the address.

Further, when the packet is input from the interface 110B, the packet processing means 130 checks whether the input packet is an encapsulated packet or not. When it is an encapsulated packet, the packet processing means 130 searches the session management table stored in the information recording device 140, using the destination address and the source address of the external IP header, the destination address and the source address of the internal IP header, the destination port number and the source port number as a search key.

When conducting search for the packet received from the interface 110B, the packet processing means 130 makes search using the following correspondences.

- The destination address of the external IP header of the received packet=The address of the anonymizing device 100
- The source address of the external IP header of the received packet=The anchor server address in the session management table
- The destination address of the internal IP header of the received packet=The anonymous address in the session management table
- The source address of the internal IP header of the received packet=The destination address in the session management table
- The destination port number of the received packet=The source port number in the session management table
- The source port number of the received packet=The destination port number in the session management table When the packet processing means 130 has found the corresponding entry as a result of searching the session management table using the above correspondences, the packet processing means 130 first performs decapsulation. Following the decapsulation, the packet processing means 130 rewrites the destination address of the internal IP header from the anonymous address into the address recorded as the source address of the retrieved entry. In other words, the packet processing means 130 performs processing of changing the address of the packet from the anonymous address back to the address of the communication node 300. Further, the packet processing means 130 sends the packet whose destination address has changed back to the address of the communication node 300 out from the interface 110A. As a result, the packet sent from the packet processing means 130 is received by the communication node 300 connected to the local network 500.

The description will continue referring back to FIG. 2. The information recording device 140 is a recording device in which the anonymization policy table shown in FIG. 3, the session management table shown in FIG. 4, and the prefix information table shown in FIG. 5 are recorded.

The description will continue referring back to FIG. 1. The anchor server 200 has a function of, upon receiving the prefix assignment request from the anonymizing device 100, assigning a prefix to the anonymizing device 100 according to the request and sending a prefix assignment response signal containing the assigned prefix as a response to the anonymizing device 100.

Further, the anchor server 200 has a function of decapsulating a packet which is transferred from the anonymizing device 100 to the anchor server 200 using tunneling. The decapsulated packet is transferred using the same processing as a common router. Further, the anchor server 200 has a function of, upon receiving a packet addressed to the anonymous address, encapsulating the received packet and transferring it to the anonymizing device 100.

Figure 6:
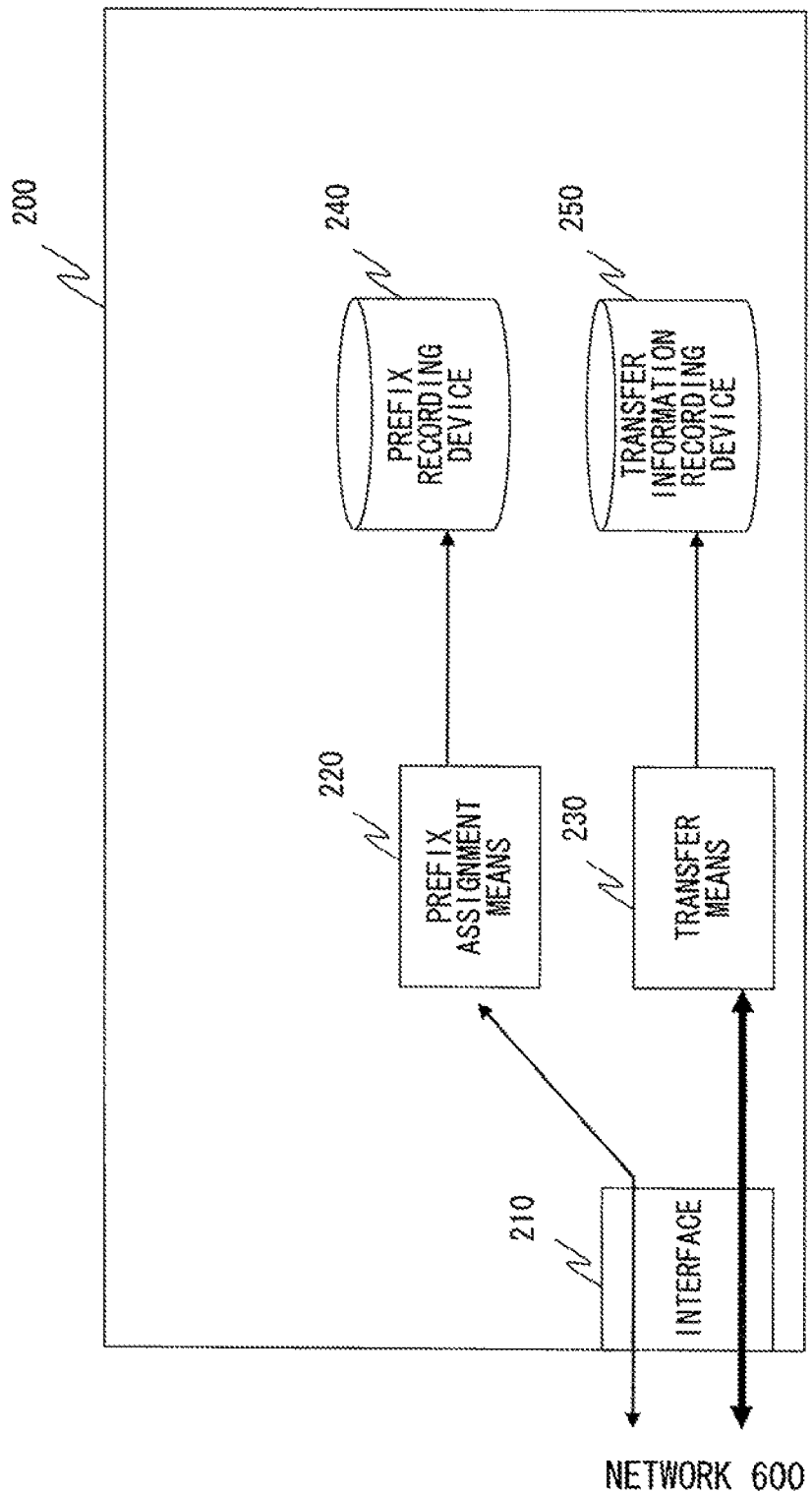
FIG. 6 is a view showing a configuration of an anchor server according to the first exemplary embodiment of the present invention.

FIG. 6 is a block diagram showing the anchor server 200. The anchor server 200 includes an interface 210, a prefix assignment means 220, a transfer means 230, a prefix recording device 240, and a transfer information recording device 250.

The interface 210 has a function of being connected to the network 600 and transmitting and receiving packets to and from other nodes (the anonymizing device 100, the server 400 etc.) which are connected to the network 600. When the received packet is the prefix assignment request signal, the interface 210 outputs the packet to the prefix assignment means 220 and, when it is another packet, the interface 210 outputs the packet to the transfer means 230. Further, the prefix assignment response signal sent as a response from the prefix assignment means 220 and the packet sent out to the network 600 from the transfer means are transmitted to the network 600 through the interface 210.

The prefix assignment means 220 has, upon receiving the prefix assignment request signal, (A) a function of accessing a lending prefix table recorded in the prefix recording device 240, (B) a function of selecting an appropriate prefix based on information contained in the prefix assignment request signal, and (C) a function of sending the prefix assignment response signal containing a prefix set number, a set of prefixes belonging to the prefix set, and an IID key and expiration time associated with each prefix as a response.

It is assumed that, in the prefix assignment request signal, one or a plurality of prefix set numbers and the number of requested prefix sets are contained as information of the prefixes already held by the anonymizing device 100. Note that, when indicating the information of the prefixes already held by the anonymizing device 100, prefixes themselves, not a prefix set, may be contained. Further, the number of requested prefixes may be also the number of prefixes themselves, not the number of prefix sets. Further, only some of the above-described information may be contained, or the above-described information may be not contained at all in the prefix assignment request signal.

When selecting prefixes to be assigned to the anonymizing device 100, the prefix assignment means 220 selects the prefixes which do not correspond to the prefix set or the prefixes contained in the prefix assignment request signal. The number of prefixes to be selected is the number of prefix sets or prefixes requested.

FIG. 7 is a view showing the lending prefix table. As shown in FIG. 7, the lending prefix table contains information of a prefix set number, a prefix, and an IID key associated with each prefix. Note that the lending prefix table may contain other information in addition to those information. For example, although it is assumed that, when calculating an expiration time, the expiration time is calculated by adding a predetermined effective time to the current time regardless of the prefix in the first exemplary embodiment, in the case of setting an effective time which differs depending on the prefix, the effective time corresponding to each prefix may be contained in the lending prefix table.

The description will continue referring back to FIG. 6. The transfer means 230 checks the data packet input from the interface 210 and, when it is an encapsulated packet, further reads the source address and the destination address of the external IP header and the source address of the internal IP header. Then, the transfer means 230 confirms that the destination address of the external IP header matches the address of the anchor server 200 itself, and further checks whether the prefix part of the source address of the internal IP header exists in the lending prefix table which is recorded in the prefix recording device 240.

Then, when the destination address of the external IP header matches the address of the anchor server 200 and the prefix part of the source address of the internal IP header exists in the lending prefix table, the transfer means 230 adds an entry to a transfer table recorded in the transfer information recording device 250 in order to store the correspondence between the source address of the external IP header and the source address of the internal IP header of the input packet (i.e. the correspondence between the address of the anonymizing device 100 and the anonymous address). At the time of adding the entry, the transfer means 230 also records the time when the correspondence between the two addresses is expired. Note that, when the same entry already exists in the transfer table, only the expiration time is updated, as described later.

FIG. 8 is a table showing the transfer table. As the expiration time in the transfer table, time calculated by adding a predetermined effective time to the time when the entry is created is set. The expiration time is updated each time processing the packet corresponding to the created entry (i.e., the packet tunneled from the anonymizing device 100, the packet transmitted addressed to the anonymous address etc.).

After adding or updating the entry to the transfer table, the transfer means 230 decapsulates the input packet and performs transfer using common IP routing.

Further, the transfer means 230 checks the data packet which is input from the interface 210 and, when it is uncapsulated packet, further searches the entries of the transfer table recorded in the transfer information recording device 250 to find out whether the entry in which the anonymous address that matches the destination address of the IP header of the input packet is set exists. When, as a result of the search, the corresponding entry is found, encapsulation is performed on the input packet. At the encapsulation, the address of the anonymizing device 100 in the corresponding entry is used as the destination address of the external IP header, and the address of the anchor server 200 itself is used as the source address of the external IP header. Following the encapsulation, the transfer means 230 performs transfer of the encapsulated packet using common IP routing.

Note that, although the anchor server 200 according to the first exemplary embodiment is described as having a function of assigning a prefix and a function of transferring a packet from an anonymous address and a packet addressed to an anonymous address, the two functions may be implemented in different servers. In the case where the functions are implemented in different servers, a server that takes on the function of assigning a prefix may include the interface 210, the prefix assignment means 220 and the prefix recording device 240, and a server that takes on the function of transferring a packet having an anonymous address may include the interface 210, the transfer means 230 and the transfer information recording device 250.

The description will continue referring back to FIG. 6. The prefix recording device 240 is a recording device that stores the lending prefix table shown in FIG. 7.

The transfer information recording device 250 is a recording device that stores the transfer table shown in FIG. 8.

The description will continue referring back to FIG. 1. The communication node 300 can access other node on the network 600, which is described below, through the anonymizing device 100. Note that the communication node 300 is a common communication node having a communication function conforming to IP, and explanation of the detailed configuration and operation thereof is omitted.

The server 400 is a server that provides a Web service and the like. Because the server 400 is a common server having a communication function conforming to IP, explanation of the detailed configuration and operation thereof is omitted.

The local network 500 is a network to which the anonymizing device 100 and the communication node 300 are connected. Although a so-called LAN (Local Area Network) such as an intranet or a home network is assumed as the local network 500, it is not limited to a LAN, and another network may be used.

The network 600 is a network to which the anonymizing device 100, the anchor server 200 and the server 400 are connected. The network 600 is a wide area network including a network provided by an ISP (Internet Service Provider) and the Internet.

Note that the interface 110A, the interface 110B and the interface 210 described above may be composed of NIC (Network Interface Card) such as a LAN card and software (driver) that causes NIC to operate, for example.

The functions of the anonymization control means 120, the packet processing means 130, the prefix assignment means 220 and the transfer means 230 described above may be implemented using software. Further, some or all of those means may be configured using hardware.

Further, the information recording device 140, the prefix recording device 240 and the transfer information recording device 250 described above may be configured using devices capable of recording information (semiconductor memory, hard disk drive etc.).

Note that the configurations of the means and the devices shown in FIGS. 1 to 8 are just examples, and they may be implemented using other configurations without departing from the spirit and scope of the present invention.

(Description of Operation)

Figure 11:
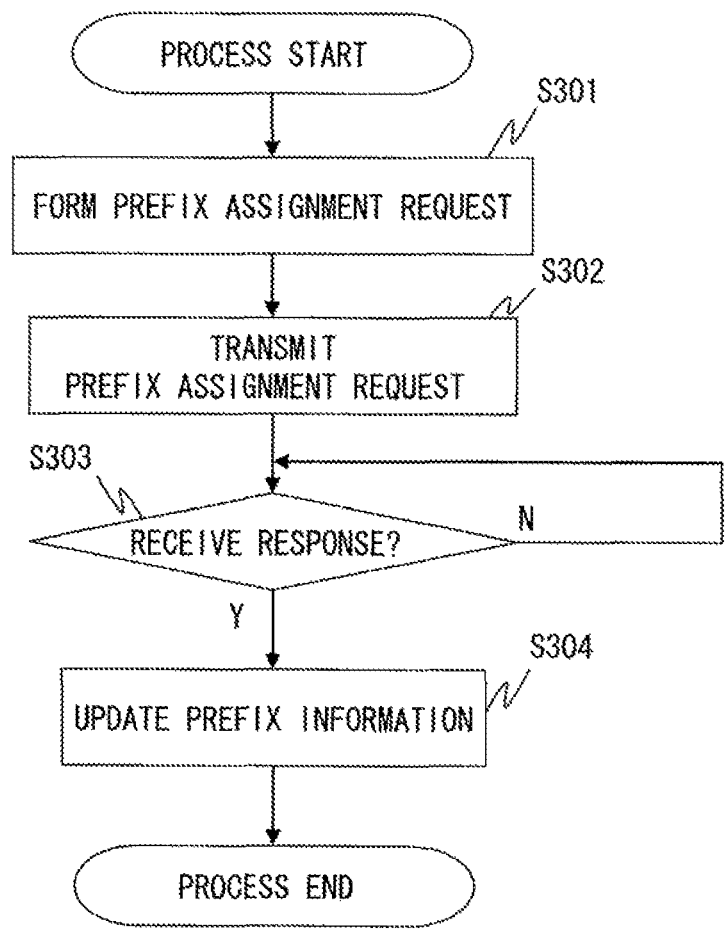
FIG. 11 is a flowchart showing a prefix request process of the anonymizing device according to the first exemplary embodiment of the present invention.
Figure 12:
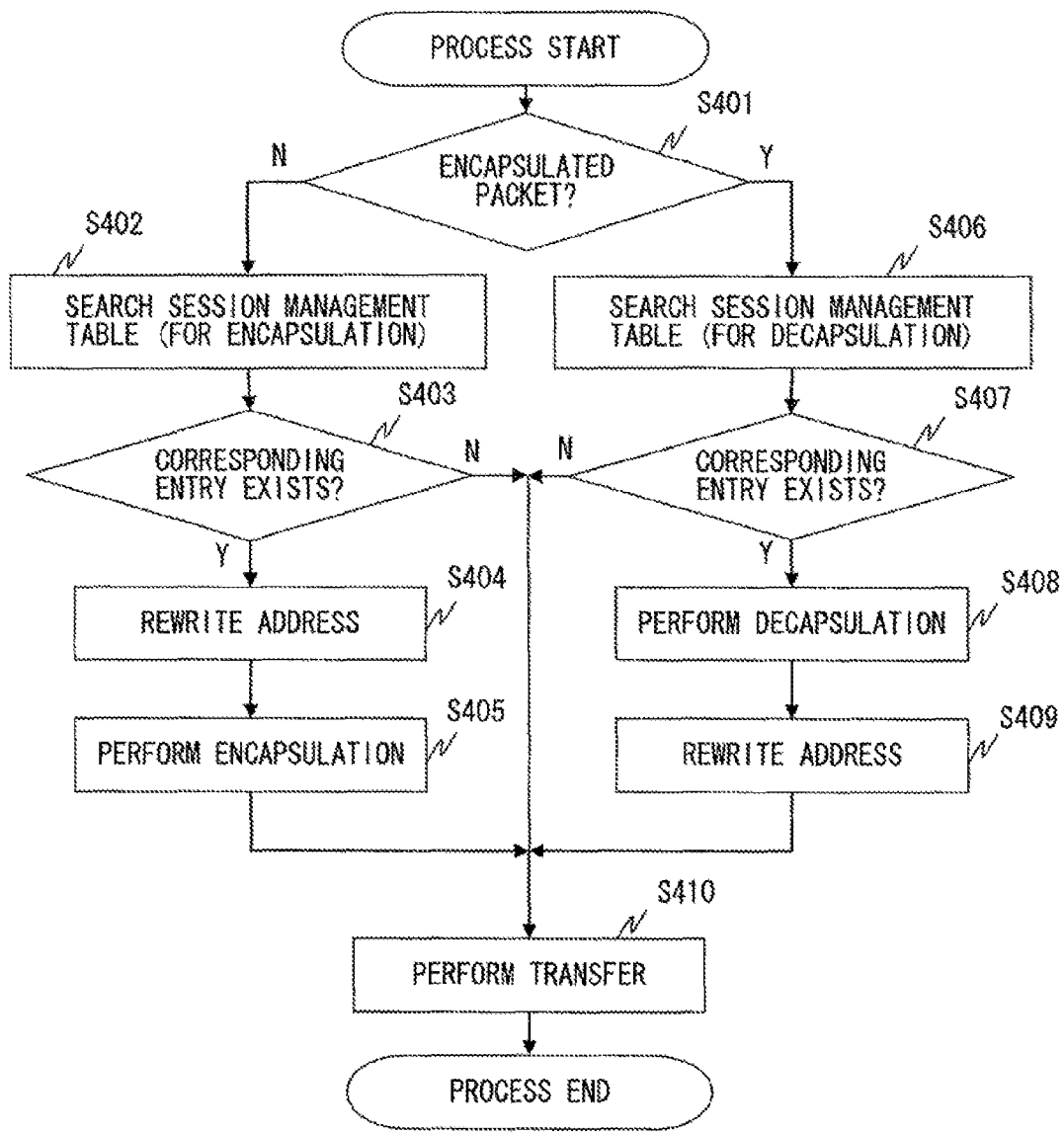
FIG. 12 is a flowchart showing packet processing of the anonymizing device according to the first exemplary embodiment of the present invention.
Figure 13:
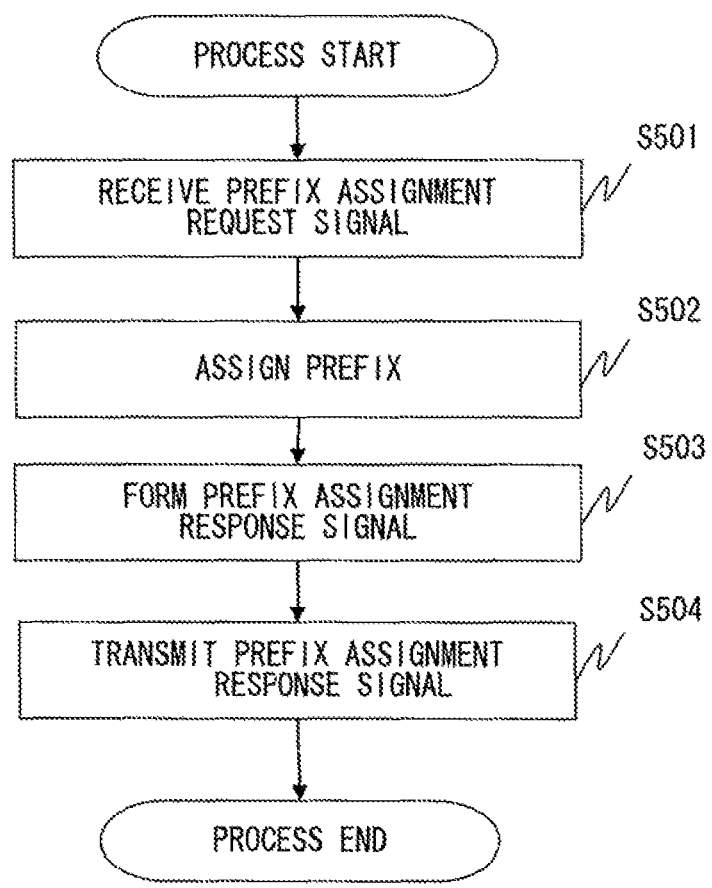
FIG. 13 is a flowchart showing an operation when receiving a prefix assignment request in the anchor server according to the first exemplary embodiment of the present invention.

The operation of the communication system 1 according to the first exemplary embodiment is described hereinafter with reference to FIGS. 9 to 18. FIGS. 9 to 12 are flowcharts showing the operation of the anonymizing device 100 when a packet is received from the communication node 300. FIGS. 13 and 14 are flowcharts showing the operation of the anchor server 200. FIGS. 15 to 18 are views to explain a flow of a series of processing operations from the start to the end of communication of the communication node 300 with the server 400.

Figure 9:
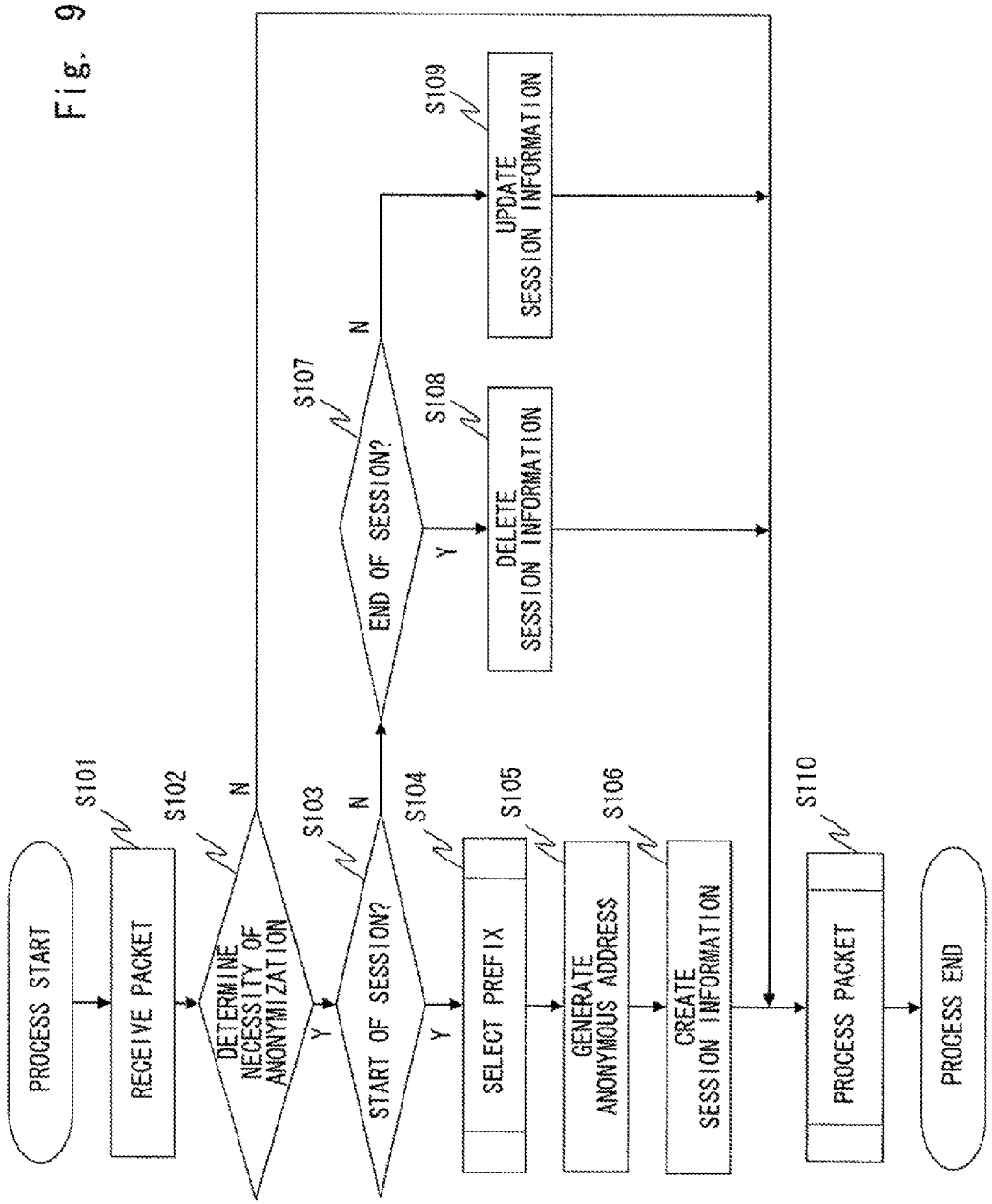
FIG. 9 is a flowchart showing an operation of the anonymizing device according to the first exemplary embodiment of the present invention.

In FIG. 9, the anonymization control means 120 of the anonymizing device 100 first receives a packet transmitted from the communication node 300 through the interface 110A (Step S101). Then, the anonymity assurance necessity determination means 121 determines whether it is necessary to assure anonymity for the received packet (Step S102). When the anonymity is determined to be necessary (i.e., when "Y"), the process proceeds to Step S103. On the other hand, when the anonymity is determined not to be necessary to be assured (i.e., when "N"), the process proceeds to Step S110.

Next, when the anonymity is determined to be necessary in Step S102, the session management means 122 checks the contents of the received packet and determines whether it is the start of a session (Step S103). When the session is the TCP session, the start of a session may be determined depending to whether the packet is a SYN packet, as described earlier. Further, at the time of determination, the session management means 122 also checks whether the entries in which information for uniquely identifying a session match do not exist in the session management table. When the overlapping entries exist, the session management means 122 does not determine that it is the start of a session. When it is determined to be the start of a session (i.e., when "Y"), the process proceeds to Step S104. On the other hand, when it is determined not to be the start of a session (i.e., when "N"), the process proceeds to Step S107.

When it is determined to be the start of a session in Step S103, the anonymous address selection means 123 selects a prefix to be used when generating an anonymous address (Step S104). Note that the detail of the processing in Step S104 which is performed by the anonymous address selection means 123 is described later with reference to FIG. 10.

Then, the anonymous address generation means 124 generates an anonymous address from the selected prefix (Step S105).

Then, the session management means 122 creates a new entry in the session management table by using the anonymous address, the information for identifying a session and the address of the anchor server 200 reachable using the anonymous address (i.e., the address of the anchor server 200 from which the prefix used when forming the anonymous address is acquired) which are acquired from the received packet in Step S101 (Step S106). After the processing in Step S106 ends, the process proceeds to Step S110.

Further, when it is determined not to be the start of a session in Step S103, the session management means 122 makes determination about the end of a session (Step S107). As described above, when the session is the TCP session, the determination about the end of a session can be made by a sequential TCP session termination procedure involving a FIN packet, an ACK+FIN packet and a FIN packet or detection of an RST packet. When it is determined to be the end of a session (i.e., when "Y"), the process proceeds to Step S108. On the other hand, when it is determined not to be the end of a session (i.e., when "N"), the process proceeds to Step S109.

When it is determined to be the end of a session in Step S107, the session management means 122 performs processing at the end of the session (Step S108). Specifically, the session management means 122 deletes the corresponding entry from the session management table, sets "N" (unassigned) as the assignment status of the corresponding entry in the prefix information table, and further updates the assignment end time to the current time. After the processing in Step S108 ends, the process proceeds to Step S110.

Further, when it is determined not to be the end of a session in Step S107, the session management means 122 updates the expiration time in the session management table (Step S109). After the processing in Step S109 ends, the process proceeds to Step S110.

Finally, the packet processing means 130 refers to the information of the session management table and, when there is a corresponding entry, rewrites the source address of the received packet into the anonymous address and further performs encapsulation for tunneling to the anchor server 200 reachable using the anonymous address (Step S110). Note that the detail of the processing in Step S110 which is performed by the packet processing means 130 is described later with reference to FIG. 12.

Figure 10:
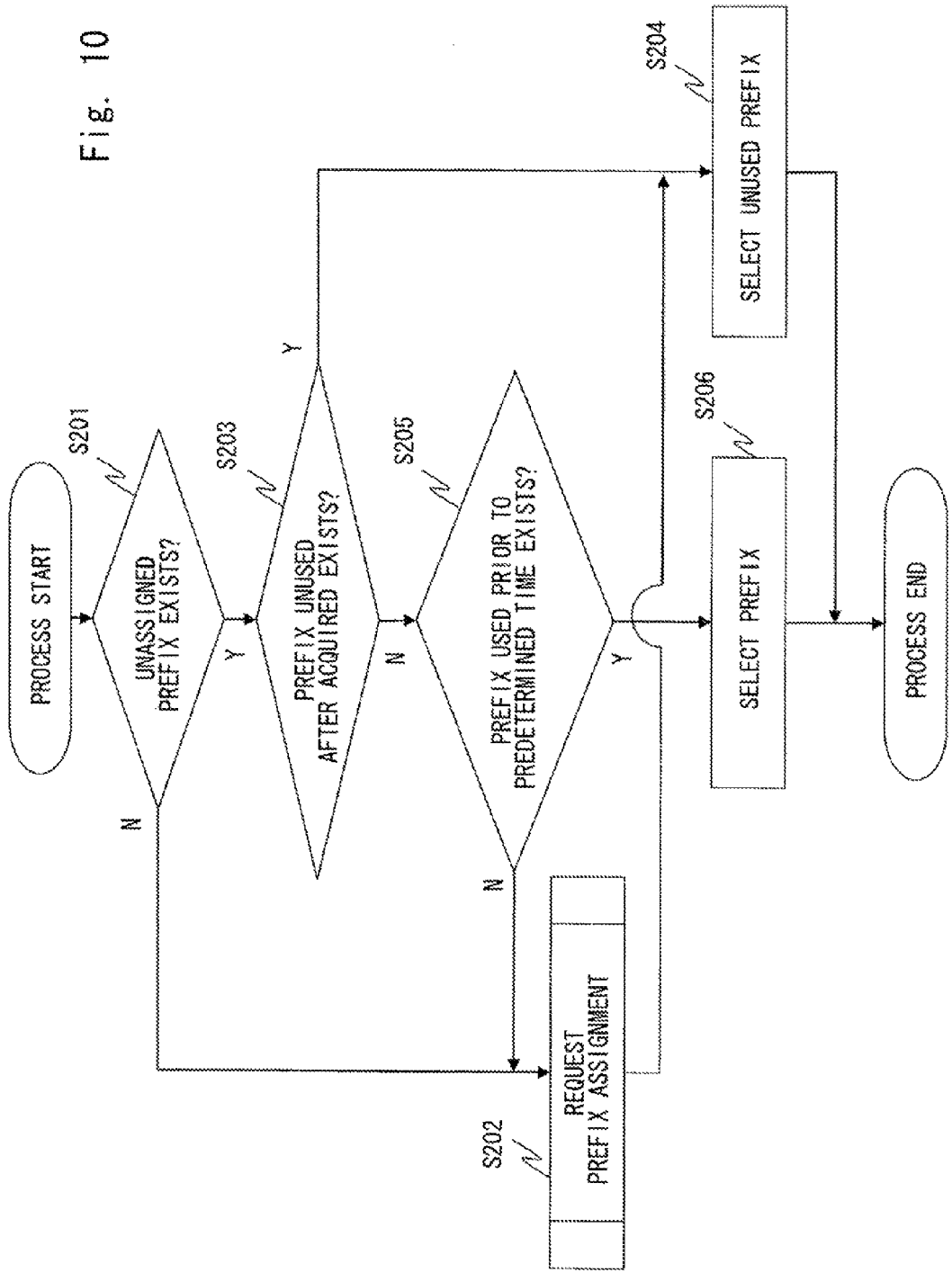
FIG. 10 is a flowchart showing a prefix determination process of the anonymizing device according to the first exemplary embodiment of the present invention.

Next, the detail of the processing in Step S104 of FIG. 9 is described hereinafter with reference to FIG. 10. FIG. 10 is a flowchart showing the operation of the prefix determination process which is performed by the anonymous address selection means 123 of the anonymizing device 100.

In FIG. 10, the anonymous address selection means 123 of the anonymizing device 100 first searches the prefix information table and extracts an unassigned prefix (Step S201). When it is determined that an unassigned prefix does not exist (i.e., when "N"), the process proceeds to Step S202 and performs processing of requesting prefix assignment as described later. On the other hand, when it is determined that one or more unassigned prefixes exist (i.e., when "Y"), the process proceeds to Step S203.

When it is determined that an unassigned prefix does not exist in Step S201, the anonymous address selection means 123 transmits the prefix assignment request signal to the anchor server 200 and thereby conducts a prefix assignment request process (Step S202). Note that the detail of the processing in Step S202 which is performed by the anonymous address selection means 123 is described later with reference to FIG. 11. Then, when a new prefix is acquired as a result of the assignment request process in Step S202, the process proceeds to Step S204.

Further, when it is determined that unassigned prefixes exist in Step S201, the anonymous address selection means 123 searches the prefix information table for a prefix which is never used after it is acquired from the anchor server 200 (Step S203). When it is determined that prefixes never used exist (i.e., when "Y"), the process proceeds to Step S204. On the other hand, when it is determined that a prefix never used does not exist (i.e., when "N"), the process proceeds to Step S205.

Following the prefix assignment request process in Step S202, or when it is determined that prefixes never used exist in Step S203, the anonymous address selection means 123 randomly selects one prefix among the prefixes which have never been used (Step S204), and thereby ends the prefix determination process.

Further, when it is determined that a prefix never used does not exist in Step S203, the anonymous address selection means 123 searches the prefix information table for prefixes whose assignment end time is in the past relative to the predetermined time (Step S205). It is assumed that the predetermined time is set in advance. When it is determined that such a prefix does not exist (i.e., when "N"), the process proceeds to Step S202. On the other hand, when it is determined that such prefixes exist (i.e., when "Y"), the process proceeds to Step S206.

Then, the anonymous address selection means 123 randomly selects one prefix among the prefixes whose assignment has been completed in the past relative to the predetermined time (Step S206), and thereby ends the prefix determination process. When selecting a prefix, processing that makes the prefix with the earlier assignment end time more likely to be selected than other prefixes by assigning weights to the probability of selection according to the assignment end time may be performed.

Note that the prefix determination process described in the first exemplary embodiment is just an example, and the prefix determination process may be performed using another method. For example, all or some of the session information (when the session is the TCP session, information such as the source address, the destination address, the source port number and the destination port number of the packet) with which the prefix is associated may be stored in advance, and a selection criterion such as not assigning the same prefix or reducing the probability to assign the same prefix to the session that matches such information may be placed.

Next, the detail of the processing in Step S202 of FIG. 10 is described hereinafter with reference to FIG. 11. FIG. 11 is a flowchart showing the operation of the prefix assignment request process which is performed by the anonymous address selection means 123 of the anonymizing device 100.

In FIG. 11, the anonymous address selection means 123 of the anonymizing device 100 forms the prefix assignment request signal in which the prefix set number, the number of prefix sets requested to be assigned, and the address of the anonymizing device 100 are set for the prefixes already stored in the anonymizing device 100 and acquired from the anchor server 200 for which the prefix assignment request is made (Step S301). Note that, as described above, the prefixes may be set instead of the prefix set number. Further, instead of the number of prefix sets requested to be assigned, the number of prefixes requested may be set.

Next, the anonymous address selection means 123 performs processing of transmitting the prefix assignment request signal formed in Step S301 to the anchor server 200 (Step S302).

Then, the anonymous address selection means 123 waits for the prefix assignment response signal sent as a response from the anchor server 200 (Step S303). When the prefix assignment response signal is received (i.e., when "Y"), the process proceeds to Step S304. When the prefix assignment response signal is not received (i.e., when "N"), reception of the prefix assignment response signal is waited.

Finally, when the prefix assignment response signal is received, the anonymous address selection means 123 performs processing of adding a new entry to the prefix information table by using information of the received prefix assignment response signal (Step S304). After the processing in Step S304 ends, the process proceeds to Step S204 shown in FIG. 10.

Next, the detail of the processing in Step S110 of FIG. 9 is described hereinafter with reference to FIG. 12. FIG. 12 is a flowchart showing the operation of the packet processing which is performed by the packet processing means 130 of the anonymizing device 100. Note that the packet processing indicates processing that is performed on the packet which is received by the interface 110A and processed by the anonymization control means 120 or the packet which is received by the interface 110B. The processing that is performed on the packet which is received by the interface 110A and processed by the anonymization control means 120 corresponds to the packet processing in Step S110 of FIG. 9.

In FIG. 12, the packet processing means 130 of the anonymizing device 100 first determines whether the received packet is encapsulated or not (Step S401). When the received packet is determined to be encapsulated (i.e., when "Y"), the process proceeds to Step S406. On the other hand, when the received packet is determined not to be encapsulated (i.e., when "N"), the process proceeds to Step S402.

When the received packet is determined not to be encapsulated in Step S401, the packet processing means 130 searches the session management table recorded in the information recording device 140 by using the information set to the received packet (S402) and checks whether the corresponding entry exists (Step S403). Note that the information compared when performing the search in Step S402 is described earlier in the explanation of the packet processing means 130, and explanation thereof is omitted. When, as a result of checking in Step S403, the corresponding entry is found (i.e., when "Y"), the process proceeds to Step S404. On the other hand, when the corresponding entry is not found (i.e., when "N"), the process proceeds to Step S410.

Then, when the corresponding entry is found in Step S403, the packet processing means 130 rewrites the source address of the received packet by using the anonymous address of the found entry (Step S404).

Then, the packet processing means 130 performs encapsulation of the packet whose source address is rewritten in Step S404 for transferring to the anchor server 200 (Step S405). After the processing in Step S405 ends, the process proceeds to Step S410.

On the other hand, when the received packet is determined to be encapsulated in Step S401, the packet processing means 130 searches the session management table recorded in the information recording device 140 by using the information set to the received packet (the encapsulated packet) (S406) and checks whether the corresponding entry exists (Step S407). Note that the information compared when performing the search in Step S406 is described earlier in the explanation of the packet processing means 130, and explanation thereof is omitted. When, as a result of checking in Step S407, the corresponding entry is found (i.e., when "Y"), the process proceeds to Step S408. On the other hand, when the corresponding entry is not found (i.e., when "N"), the process proceeds to Step S410.

Then, when the corresponding entry is found in Step S407, the packet processing means 130 decapsulates the received packet (Step S408). Specifically, the packet processing means 130 removes the external IP header of the received packet.

Then, the packet processing means 130 rewrites the destination address of the decapsulated packet into the address recorded as the source address in the session management table (Step S409). By the address rewriting, the address of the received packet is written back to the address of the communication node 300 from the anonymous address. After the processing in Step S409 ends, the process proceeds to Step S410.

Finally, the packet processing means 130 routes the packet using a common IP routing function, and sends out the packet from an appropriate interface according to the destination address (Step S410). For example, the packet which is encapsulated in Step S405 is addressed to the anchor server 200 and thus sent out to the network 600 from the interface 110B. Further, for example, the packet which is decapsulated and whose destination address is rewritten to the address of the communication node 300 in Step S409 is sent out to the network 500 from the interface 110A.

Next, the operation of the anchor server 200 is described in detail with reference to FIGS. 13 and 14. FIG. 13 is a flowchart showing the operation of the prefix assignment process which is performed by the prefix assignment means 220 of the anchor server 200 when the prefix assignment request signal is received.

In FIG. 13, the anchor server 200 first receives the prefix assignment request signal (Step S501). Then, the prefix assignment means 220 of the anchor server 200 selects an appropriate prefix from the lending prefix table recorded in the prefix recording device 240 (Step S502). Note that the prefix selection method which is performed by the prefix assignment means 220 is described earlier in the explanation of the prefix assignment means 220, and explanation thereof is omitted.

Next, the prefix assignment means 220 forms the prefix assignment response signal (Step S503). In the prefix assignment response signal, the assigned prefix set number, the prefixes, the IID key, the prefix expiration time and the address of the anchor server 200 are contained.

Finally, the prefix assignment means 220 transmits the prefix assignment response signal formed in Step S503 to the anonymizing device 100 from which the prefix assignment request signal has been transmitted (Step S504).

FIG. 14 is a flowchart showing the operation of the packet transfer process which is performed by the transfer means 230 of the anchor server 200 when a data packet is received.

In FIG. 14, the transfer means 230 of the anchor server 200 first determines whether the received packet is encapsulated or not (Step S601). When the received packet is determined to be encapsulated (i.e., when "Y"), the process proceeds to Step S602. On the other hand, when the received packet is determined not to be encapsulated (i.e., when "N"), the process proceeds to Step S609.

When the received packet is determined to be encapsulated in Step S601, the transfer means 230 evaluates whether the destination address of the external IP header of the received packet (the encapsulated packet) is the address of the anchor server 200 itself, and the prefix part of the source address of the internal IP header is contained in the prefix stored for assignment in the anchor server 200 (Step S602). As a result of the evaluation, when the conditions for the destination address of the external IP header and the source address of the internal IP header of the received packet are satisfied (i.e., when "Y"), the process proceeds to Step S603. On the other hand, when the conditions are not satisfied (i.e., when "N"), the process proceeds to Step S608.

When the above-described conditions are satisfied in Step S602, the transfer means 230 searches the transfer table recorded in the transfer information recording device 250, setting the source address of the internal IP header of the received packet as the anonymous address (Step S603), and checks whether the corresponding entry exists (Step S604). When, as a result of checking in Step S604, the corresponding entry is found (i.e., when "Y"), the process proceeds to Step S605. On the other hand, when it is not found (i.e., when "N"), the process proceeds to Step S606.

Then, when the corresponding entry is found in Step S604, the transfer means 230 updates the expiration time of the retrieved entry in the transfer table (Step S605). On the other hand, when the corresponding entry is not found (i.e., when "N") in Step S604, the transfer means 230 adds a new entry to the transfer table (Step S606). When adding an entry, the source address of the internal IP header of the received packet is set as the anonymous address, the source address of the external IP header is set as an item of the anonymizing device 100, and the value obtained by adding a predetermined time to the current time is set as the expiration time.

Then, the transfer means 230 performs decapsulation of the received packet (Step S607). Finally, the transfer means 230 conducts the transfer of the decapsulated packet using common IP routing (Step S608).

On the other hand, when the received packet is determined not to be encapsulated in Step S601, the transfer means 230 searches the transfer table recorded in the transfer information recording device 250, setting the destination address of the received packet as the anonymous address (Step S609), and checks whether the corresponding entry exists (Step S610). When, as a result of checking in Step S610, the corresponding entry is found (i.e., when "Y"), the process proceeds to Step S611. On the other hand, when it is not found (i.e., when "N"), the process proceeds to Step S608.

When the corresponding entry is found in Step S610, the transfer means 230 updates the expiration time of the retrieved entry in the transfer table in the same manner as in the processing of Step S605 described above (Step S611).

Then, the transfer means 230 performs encapsulation of the received packet by using information of the retrieved entry (Step S612). After the processing in Step S612 ends, the process proceeds to Step S608.

Hereinafter, a series of processing operations from the start to the completion of the communication of the communication node 300 with the server 400 are described with reference to FIGS. 15 to 18. FIG. 15 is a sequence chart to explain the processing performed by each function of the anonymizing device 100 and the anchor server 200 from the start to the completion of the communication of the communication node 300 with the server 400. Note that, in FIG. 15, the case where the communication node 300 makes Web access to the server 400 is illustrated as an example. Further, the address of the anonymizing device 100 is CPE_ADR1, the address of the anchor server 200 is Anch_ADR1, the address of the communication node 300 is Cl_ADR1, and the address of the server 400 is Sv_ADR1.

In Step S701 of FIG. 15, the communication node 300 first resolves the IP address of the server 400 from FQDN (Fully Qualified Domain Name) of the server 400. Note that, although FQDN of the server 400 is acquired in advance using DNS (Domain Name Server) or the like, DNS is not needed when the IP address of the server 400 is known.

Next, in Step S702 of FIG. 15, the communication node 300 transmits a SYN packet to the server 400 in order to start a TCP session with the server 400. The transmission packet is first transmitted to the anonymizing device 100, which acts as a gateway to the network 600 for the communication node 300. When transmitting the packet, the destination address of the SYN packet is Sv_ADR1, the source address thereof is Cl_ADR1, the destination port number is 80, and the source port number is 20000.

Then, in Step S703 of FIG. 15, the anonymizing device 100 receives the SYN packet and then executes the above-described series of processing operations shown in FIG. 9. It is assumed that, in the anonymizing device 100, in the determination about the necessity of anonymization in Step S102 of FIG. 9, the item of the necessity of anonymization of the entry No. 1 which is found as a result of the search of the anonymization policy table (FIG. 3) is "Yes", which means that the anonymization is necessary. Then, in the determination about the start of a session in Step S103 of FIG. 9, because the received packet is the SYN packet, the anonymizing device 100 makes search to find whether the corresponding entry of the session exists in the session management table (FIG. 4). Because the corresponding entry does not exist as a result of the search, the anonymizing device 100 determines that it is the start of a session. The process thereby proceeds to Step S104 of FIG. 9

Then, in Step S104 of FIG. 9, the anonymizing device 100 selects a prefix to be assigned from the prefix information table according to the algorithm shown in FIG. 10. In the example of the prefix information table shown in FIG. 5, Pref_A3 and Pref_B9 are candidates for the prefix to be assigned; however, it is assumed in this example that the assignment end time does not meet the conditions. In other words, this is the case where a prefix that satisfies the conditions does not exist in Step S205 of FIG. 10, and the prefix assignment request process in Step S202 of FIG. 10 is conducted. As described above, the detail of the prefix assignment request process in Step S202 of FIG. 10 is illustrated using the flowchart of FIG. 11.

In Step S301 of FIG. 11, the anonymizing device 100 first forms the prefix assignment request signal. In this example, the respective values are set in the prefix assignment request signal, assuming that the number of prefix sets requested is 1, the number of prefix set information already stored is 1, and the address of the anonymizing device 100 is CPE_ADR1.

Then, the anonymizing device 100 transmits the prefix assignment request signal to the anchor server 200 in Step S302 of FIG. 11, and waits for reception of the prefix assignment response signal in Step S303.

Then, in Step S704 of FIG. 15, the prefix assignment request signal reaches the anchor server 200. Then, in Step S705, the anchor server 200 executes the processing upon receiving the prefix assignment request signal as shown in FIG. 13. It is assumed in this example that, as a result of the processing shown in FIG. 13, the prefix set with the prefix set number 2 in the lending prefix table (FIG. 7) is assigned. As a result of the prefix assignment process, the anchor server 200 transmits the prefix assignment response signal containing the assigned prefix set number, the prefixes, the IID key, the expiration time, and the address of the anchor server 200 to the anonymizing device 100.

Then, in Step S706 of FIG. 15, the prefix assignment response signal reaches the anchor server 200. Then, in Step S707, the anchor server 200 comes out of the processing of waiting for reception of the prefix assignment response signal in Step S303 of FIG. 11 and, in Step S304, updates the prefix information table using the prefix information contained in the received prefix assignment response signal. As a result of the update, the entry with the prefix set number 2 is added to the prefix information table as shown in FIG. 16.

Then, in Step S204 of FIG. 10, the anonymizing device 100 makes selection of an unused prefix. Pref_A4 is selected in this example.

Then, in Step S105 of FIG. 9, the anonymizing device 100 generates an anonymous address by use of the IID portion calculated using Equations 1 and 2 described above and the prefix Pref_A4. The generated anonymous address is An_ADR4 in this example. After determining the anonymous address, the anonymizing device 100 adds a new entry to the session management table in Step S106 of FIG. 9. In this example, the entry No. 4 is added to the session management table as shown in FIG. 17.

Then, in Step S110 of FIG. 9, the anonymizing device 100 rewrites the source address of the SYN packet from Cl_ADR1 to An_ADR4 based on the entry No. 4 of the session management table and, after that, encapsulates the packet and transfers the encapsulated packet.

Then, in Step S708 of FIG. 15, the anchor server 200 receives the encapsulated SYN packet from the anonymizing device 100 and then conducts processing according to the flowchart shown in FIG. 14. At the time of receiving the encapsulated SYN packet, the entry of the anonymous address (An_ADR4) does not exist in the transfer table, and therefore the anchor server 200 adds a new entry. FIG. 18 shows the transfer table to which the entry has been added. In this example, the entry added to the transfer table is the entry No. 4. The anchor server 200 then decapsulates the received packet and transfers the decapsulated packet to the server 400.

Then, in Step S709 of FIG. 15, the server 400 receives the SYN packet from the anchor server 200 and then sends a SYN+ACK packet as a response to the anonymous address (An_ADR1). Because An_ADR1 has the prefix (Pref_A4) having reachability to the anchor server 200, the SYN+ACK packet is routed to the anchor server 200.

Then, the anchor server 200 receives the SYN+ACK packet from the server 400 and then conducts processing according to the flowchart shown in FIG. 14. In this example, because the entry No. 4 exists in the transfer table (FIG. 18), the anchor server 200 encapsulates the received packet and then transfers encapsulated packet to the address (CPE_ADR1) of the anonymizing device 100.

Then, the anonymizing device 100 receives the encapsulated SYN+ACK packet. The packet processing means 130 of the anonymizing device 100 conducts processing according to the flowchart shown in FIG. 12. Because the entry No. 4 exists in the session management table (FIG. 17), the packet processing means 130 decapsulates the received packet and rewrites the destination address from the anonymous address (An_ADR1) to the address (Cl_ADR1) of the communication node 300. After that, the packet processing means 130 transfers the packet whose address is rewritten to the communication node 300.

Finally, in Step S710 of FIG. 15, an ACK packet and a data packet are exchanged between the communication node 300 and the server 400. Like the SYN packet and the SYN+ACK packet described above, the packet transmitted from the communication node 300 to the server 400 is converted into the anonymous address and encapsulated by the anonymizing device 100, decapsulated by the anchor server 200 and then reaches the server 400. Further, the packet transmitted from the server 400 to the communication node 300 is encapsulated by the anchor server 200, and then decapsulated and converted from the anonymous address back into the address of the communication node 300 by the anonymizing device 100.

As described above, in the communication system 1 according to the first exemplary embodiment, in the anonymizing device 100, the session management means 122 identifies a session, the anonymous address selection means 123 and the anonymous address generation means 124 generate an anonymous address which is different from session to session, and further the packet processing means 130 rewrites the source address of the transmission packet of the communication node 300 into the anonymous address and then tunnels the packet to the anchor server 200 reachable using the anonymous address.

It is thereby possible to configure an individual anonymous address in each session and further assure the anonymity for the anonymous address including the prefix part. Further, because it is not necessary to assign the anonymous addresses to the interface of the anonymizing device 100, the problem of loads of Neibhbor Cache does not occur, and the problem of delay of processing using DAD also does not occur. Further, the problem of ingress filtering in Patent Literature 1 described above and the problem of inapplicability to TCP also do not occur. Further, the communication environment using the anonymous address can be provided also for a mobile node 300, which is a typical IP node.

Further, in the communication system 1 according to the first exemplary embodiment, the anonymous address selection means 123 selects a prefix in consideration of the time when the prefix has been selected prior to the selection, thereby avoiding the use of the anonymous address having the same prefix within close time proximity, thus achieving high anonymity.

Further, in the communication system 1 according to the first exemplary embodiment, when there is no prefix to act as a candidate when forming an anonymous address, the anonymous address selection means 123 transmits the prefix assignment request signal and thereby requests the anchor server 200 to assign a prefix. When requesting the prefix assignment, the prefix information which is already held by the anonymizing device 100 is passed, so that the anchor server 200 can assign a prefix which is not yet held by the anonymizing device 100 without the need for storing the prefix information already assigned to the anonymizing device 100.

Further, when requesting the prefix assignment, the prefix which is already held by the anonymizing device 100 is notified using the prefix set number, thereby reducing the size of the prefix assignment request signal. This also reduces the amount of processing of the search performed by the anchor server 200 for a prefix which is not yet held by the anonymizing device 100. This feature is significantly effective in the case of providing an anonymization service to a huge number of anonymizing devices 100, for example.

Further, in the communication system 1 according to the first exemplary embodiment, the anonymous address generation means 124 calculates an anonymous address so that the anonymizing device 100 which has used the anonymous address can be specified by using information such as the anonymous address and the port number which can be acquired by an administrator of the server 400 and information which is held only by an operator who administers the anchor server 200. Therefore, the operator who administers the anchor server 200 does not need to record every correspondence between the anonymous address and the anonymizing device 100 which varies from session to session, thus assuring the traceability.

Second Exemplary Embodiment

A second exemplary embodiment of the present invention is described hereinafter with reference to FIGS. 19 to 26.
(Description of Configuration)

First, a configuration of a communication system 1 according to the second exemplary embodiment is described with reference to FIGS. 19 to 23. The overall configuration of the communication system 1 according to the second exemplary embodiment is substantially the same as that of the communication system 1 according to the first exemplary embodiment shown in FIG. 1. Differences are that the anonymizing device 100 shown in FIG. 2 is replaced by an anonymizing device 101 shown in FIG. 19, and the anchor server 200 shown in FIG. 6 is replaced by an anchor server 201 shown in FIG. 20 in the communication system 1 according to the second exemplary embodiment. A further difference is that the anchor server 201, not the anonymizing device 101, is configured to perform rewriting to an anonymous address in the communication system 1 according to the second exemplary embodiment.

Figure 19:
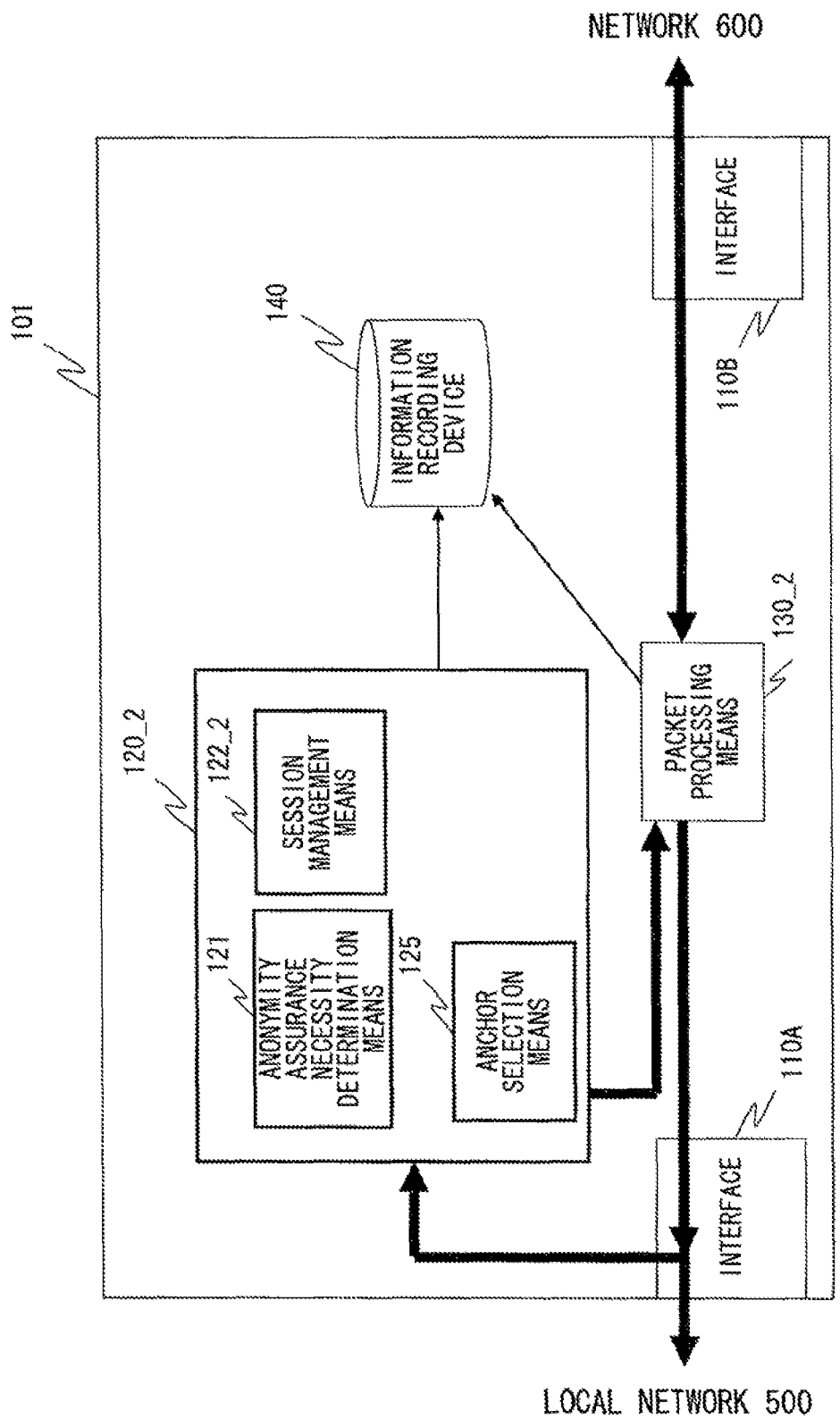
FIG. 19 is a view showing a configuration of an anonymizing device according to a second exemplary embodiment of the present invention.

FIG. 19 is a block diagram showing the anonymizing device 101. As shown in FIG. 19, the anonymizing device 101 includes an interface 110A, an interface 110B, an anonymization control means 120_2, a packet processing means 130_2, and an information recording device 140. The anonymization control means 120_2 include an anonymity assurance necessity determination means 121, a session management means 122_2, and an anchor selection means 125. Note that the elements having the same functions as those of the elements of the anonymizing device 100 shown in FIG. 2 are denoted by the same names and reference numerals in FIG. 19, and detailed explanation thereof is omitted below.

The session management means 122_2, like the session management means 122 according to the first exemplary embodiment, has a function of determining the start and the end of a session, which is a specific sequential unit of communication, and a function of managing a session management table recorded in the information recording device 140. Note that, as shown in FIG. 21, the session management table which is managed by the session management means 122_2 is different from the session management table according to the first exemplary embodiment in that it does not include anonymous addresses.

Further, the session management means 122_2 outputs a request for assignment of the anchor server 201 for requesting anonymization, in place of the request for assignment of an anonymous address, to the anchor selection means 125. When the session management means 122_2 acquires the address of the anchor server 201 as a result of the request for assignment of the anchor server 201, the session management means 122_2 sets the acquired address of the anchor server 201 to the item of an anchor server address in the session management table (FIG. 21).

The anchor selection means 125 has a function of selecting the anchor server 201 to which anonymization is to be requested in response to the anchor server assignment request from the session management means 122_2 and sending the address of the selected anchor server 201 as a response to the session management means 122_2. The anchor selection means 125 randomly selects the address of the anchor server 201 from the addresses of the anchor server 201 previously set to the anonymizing device 101.

Note that, the configuration may be such that the anchor selection means 125 can acquire the destination address of a packet transmitted from the communication node 300, and the assigned anchor server 201, the destination address of the transmitted packet and the time of receipt are recorded in association with one another, and, for the session with the same destination address, the selection of the same address as the address of the anchor server 201 assigned within a given time period is avoided or is made less likely by assigning weights to the probability of selection. As a matter of course, another selection method may be used for selection.

The packet processing means 130_2, like the packet processing means 130 according to the first exemplary embodiment, refers to the session management table recorded in the information recording device 140 and performs encapsulation and decapsulation of the packet. Note that the packet processing means 130_2 is different from the packet processing means 130 according to the first exemplary embodiment in that it does not perform rewriting from the address of the communication node 300 to the anonymous address and rewriting from the anonymous address to the address of the communication node 300.

The information recording device 140 is a recording device in which the policy table shown in FIG. 3 and the session management table shown in FIG. 21 are recorded.

Figure 20:
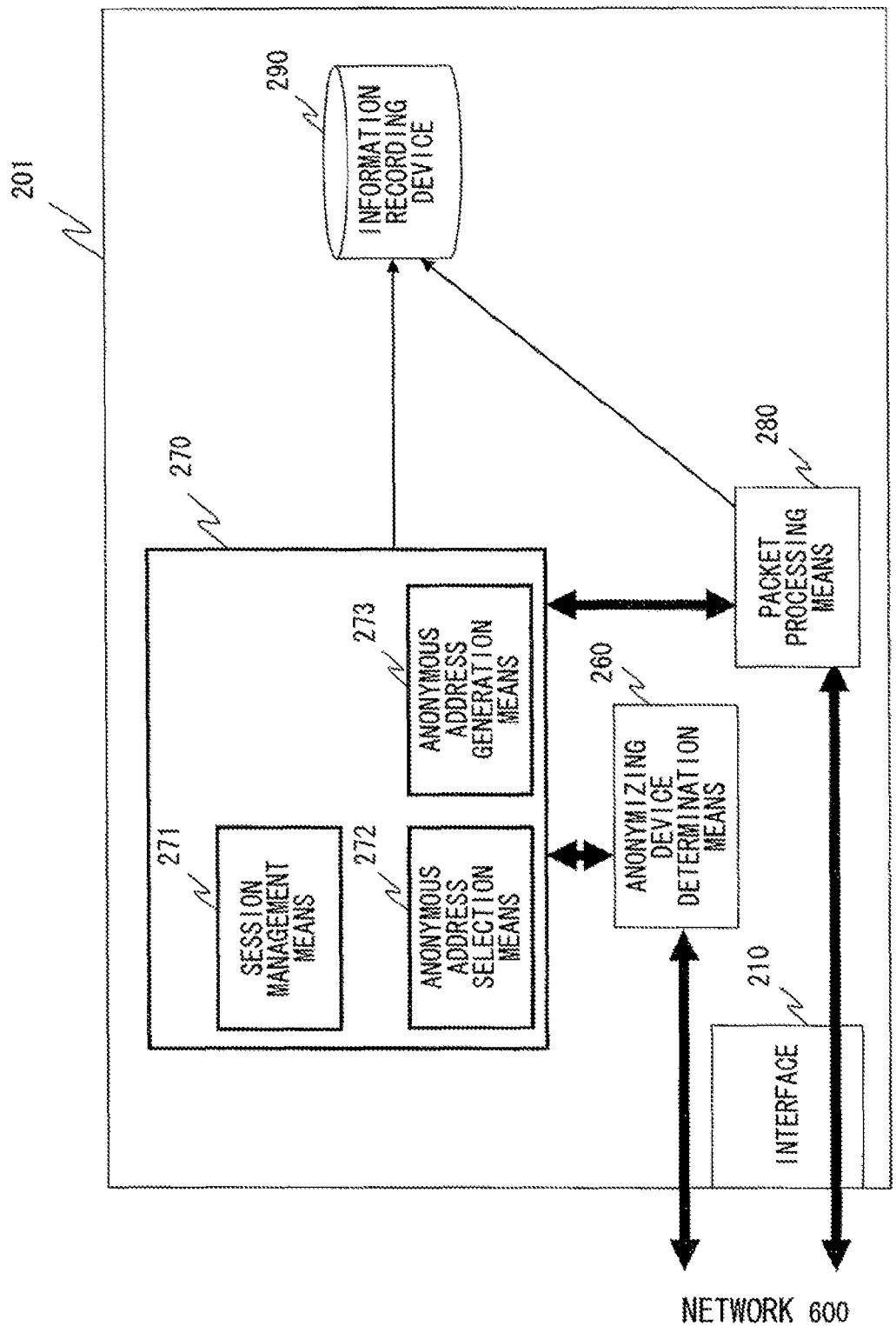
FIG. 20 is a view showing a configuration of an anchor server according to the second exemplary embodiment of the present invention.

FIG. 20 is a block diagram showing the anchor server 201. As shown in FIG. 20, the anchor server 201 includes an interface 210, an anonymizing device determination means 260, an anonymization control means 270, a packet processing means 280, and an information recording device 290. Note that the elements having the same functions as those of the elements of the anchor server 200 shown in FIG. 6 are denoted by the same names and reference numerals in FIG. 20, and detailed explanation thereof is omitted below.

When the packet received by the interface 210 is an encapsulated packet, the anonymizing device determination means 260 checks whether the destination address of the external IP header is the address of the anchor server 201 and the source address of the external IP header is the anonymizing device 101 authorized to use the anchor server 201. As a result of checking, the anonymizing device determination means 260 outputs the packet that meets the conditions to the anonymization control means 270. The anonymizing device determination means 260 discards the packet that does not the meet conditions. Note that common routing may be simply performed without discarding the packet.

When the anonymizing device determination means 260 makes determination whether the anonymizing device 101 is authorized to use the anchor server 201, the anonymizing device determination means 260 may store a list of the addresses of the authorized anonymizing devices 101 in advance and refer to the stored list at the time of the determination. Further, another method may be applied, such as applying a method of granting certification information indicating that the use of the anchor server 201 is authorized to the tunneled packet, for example.

When the packet is input from the anonymizing device determination means 260, the anonymization control means 270 generates an anonymous address using information of the input packet, information of a prefix information table (FIG. 23) recorded in the information recording device 290 and the like. Further, the anonymization control means 270 prepares for rewriting the address of the communication node 300 to the anonymous address. Furthermore, the anonymization control means 270 outputs the input packet to the packet processing means 280.

As shown in FIG. 20, the anonymization control means 270 includes a session management means 271, an anonymous address selection means 272, and an anonymous address generation means 273. The anonymization control means 270 has a function similar to that of the anonymization control means 120 according to the first exemplary embodiment.

The session management means 271, like the session management means 122 according to the first exemplary embodiment, has a function of determining the start and the end of a session upon input of a packet from the anonymizing device determination means 260, and a function of managing a session management table recorded in the information recording device 290. In the second exemplary embodiment, a TCP session is assumed as the session, and the TCP session is identified based on the destination address, the source address, the destination port number and the source port number. Note that, the session is not limited to the TCP session, another unit may be assumed as the session.

Although the functions of the session management means 271 (the function of determining the start and the end of a session and the function of managing a session) are substantially the same as the functions of the session management means 122 according to the first exemplary embodiment, there is a difference in that the start and the end of a session are determined using an IP packet contained in the encapsulated packet.

Further, there is also a difference in that the session management table which is managed by the session management means 271 records the address of the anonymizing device 101, instead of the address of the anchor server 201, as shown in FIG. 22.

When creating an entry for a new session, the session management means 271 can set the source address of the external IP header of the encapsulated packet to the item of the address of the anonymizing device 101. Alternatively, in the configuration where the address of the anonymizing device 101 is output separately to the session management means 271 after the anonymizing device determination means 260 determines that it is the anonymizing device 101 which is authorized to use the anchor server 201, the session management means 271 can set the input address of the anonymizing device 101 to the item of the anonymizing device address in the session management table.

Further, when adding an entry, the session management means 271 requests an anonymous address to the anonymous address selection means 272 and sets the anonymous address obtained as a result of the request to the item of the anonymous address in the session management table.

When an anonymous address is requested from the session management means 271, the anonymous address selection means 272 randomly selects one prefix from the prefix information table (FIG. 23) recorded in the information recording device 290. Note that, as a prefix selection method, the prefix, the anonymizing device 101 to which the prefix is assigned, and the assignment time may be recorded in association with one another, and, the selection of the same prefix for the same anonymizing device 101 within a predetermined time period may be avoided or made less likely by assigning weights to the probability of selection.

After selecting the prefix, the anonymous address selection means 272 outputs the selected prefix and IID key information associated with the prefix to the anonymous address generation means 273 and thereby acquires an anonymous address. Then, the anonymous address selection means 272 sends the acquired anonymous address as a response to the session management means 271.

The anonymous address generation means 273 operates in the same manner as the anonymous address generation means 124 according to the first exemplary embodiment, and detailed explanation thereof is omitted.

The packet processing means 280 performs processing of decapsulating a packet input to the packet processing means 280 and then rewriting the source address of the packet to the anonymous address by referring to the session management table recorded in the information recording device 290. Further, the packet processing means 280 performs processing of rewriting the anonymous address of a packet input to the packet processing means 280 to the address of the communication node 300 and encapsulating the packet by referring to the session management table. Further, the packet processing means 280 transfers the decapsulated or encapsulated packet by using common IP routing.

Further, when searching the session management table for the encapsulated packet, the packet processing means 280 compares the source address of the external IP header, the destination address of the internal IP header, the source address of the internal IP header, the destination port number and the source port number with the values set to the anonymizing device address, the destination address, the source address, the destination port and the source port in the session management table. At the comparison, the packet processing means 280 also checks whether the destination address of the external IP header matches the address of the anchor server 201.

On the other hand, when searching the session management table at the reception of the uncapsulated packet, the packet processing means 280 compares the destination address of the received packet with the address set to the anonymous address in the session management table. As a result of the comparison, when the matching entry is found, the packet processing means 280 rewrites the destination address of the received packet to the address set to the source address in the session management table. Then, the packet processing means 280 performs encapsulation, using the address set to the anonymizing device address in the session management table as the destination address of the external IP header, and the address of the anchor server 201 as the source address of the external IP header.

The information recording device 290 is a recording device in which the session management table shown in FIG. 22 and the prefix information table shown in FIG. 23 are recorded.

The functions of the anonymization control means 120_2, the packet processing means 130_2, the anonymizing device determination means 260, the anonymization control means 270 and the packet processing means 280 described above may be implemented using software. Further, some or all of those means may be configured using hardware.

Further, the information recording device 290 described above may be configured using devices capable of recording information (semiconductor memory, hard disk drive etc.).

Note that the configurations of the means and the devices shown in FIGS. 19 to 23 are just examples, and they may be implemented using other configurations without departing from the spirit and scope of the present invention.

In the configuration of the communication system 1 according to the second exemplary embodiment, the anchor server 201 performs rewriting to an anonymous address, so that processing performed by the anonymizing device 101 can be simplified.

Further, if slight degradation of anonymity is allowable, a static tunnel may be built between the anonymizing device 101 and the anchor server 201. In such a configuration, the anonymization control means 120_2 of the anonymizing device 101 can be eliminated, and processing performed by the anonymizing device 101 can be further simplified. Note that a static tunnel can be built by creating one entry in the session management table of the information recording device 140 manually, for example, in advance.

(Description of Operation)

Figure 24:
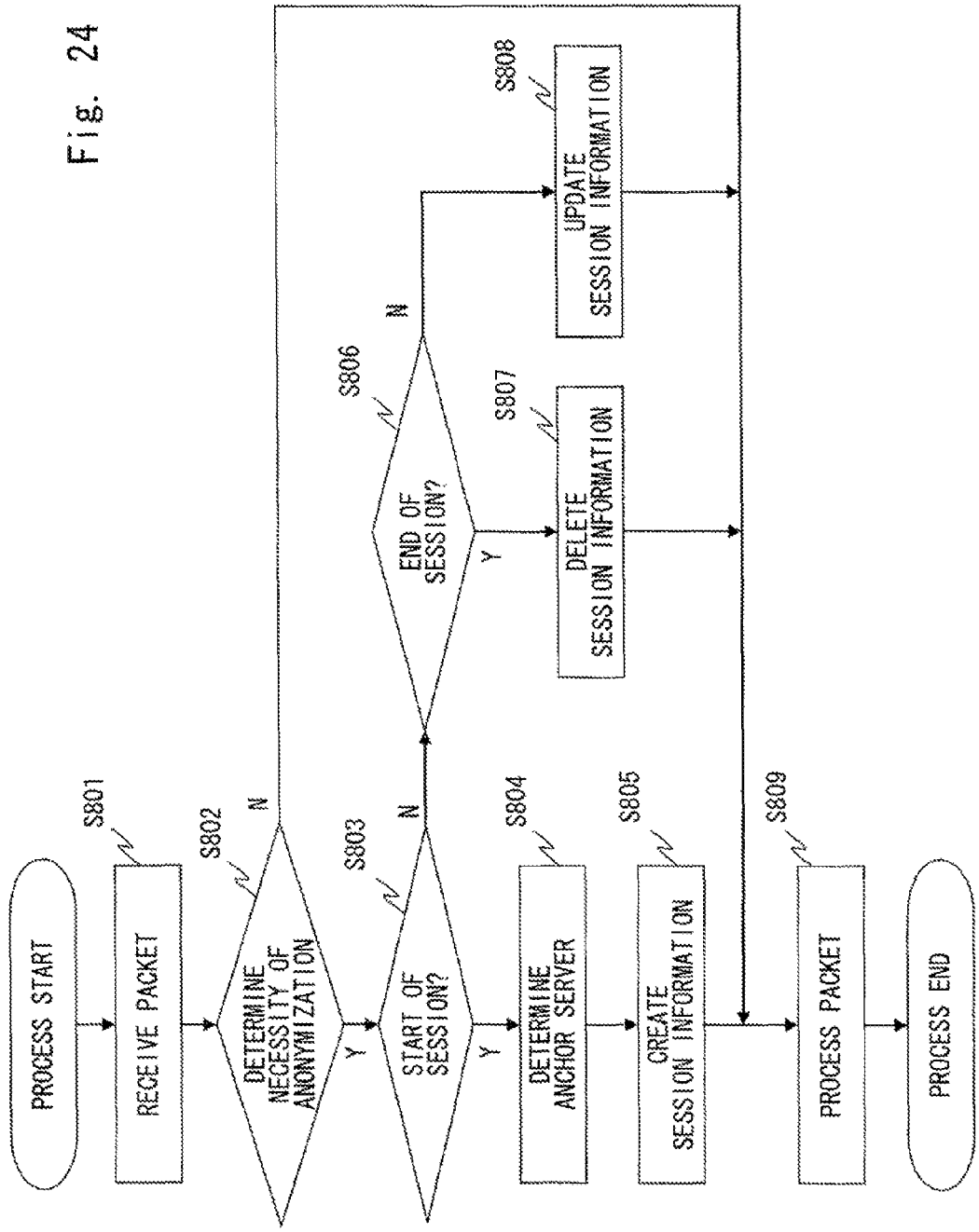
FIG. 24 is a flowchart showing an operation of the anonymizing device according to the second exemplary embodiment of the present invention.
Figure 25:
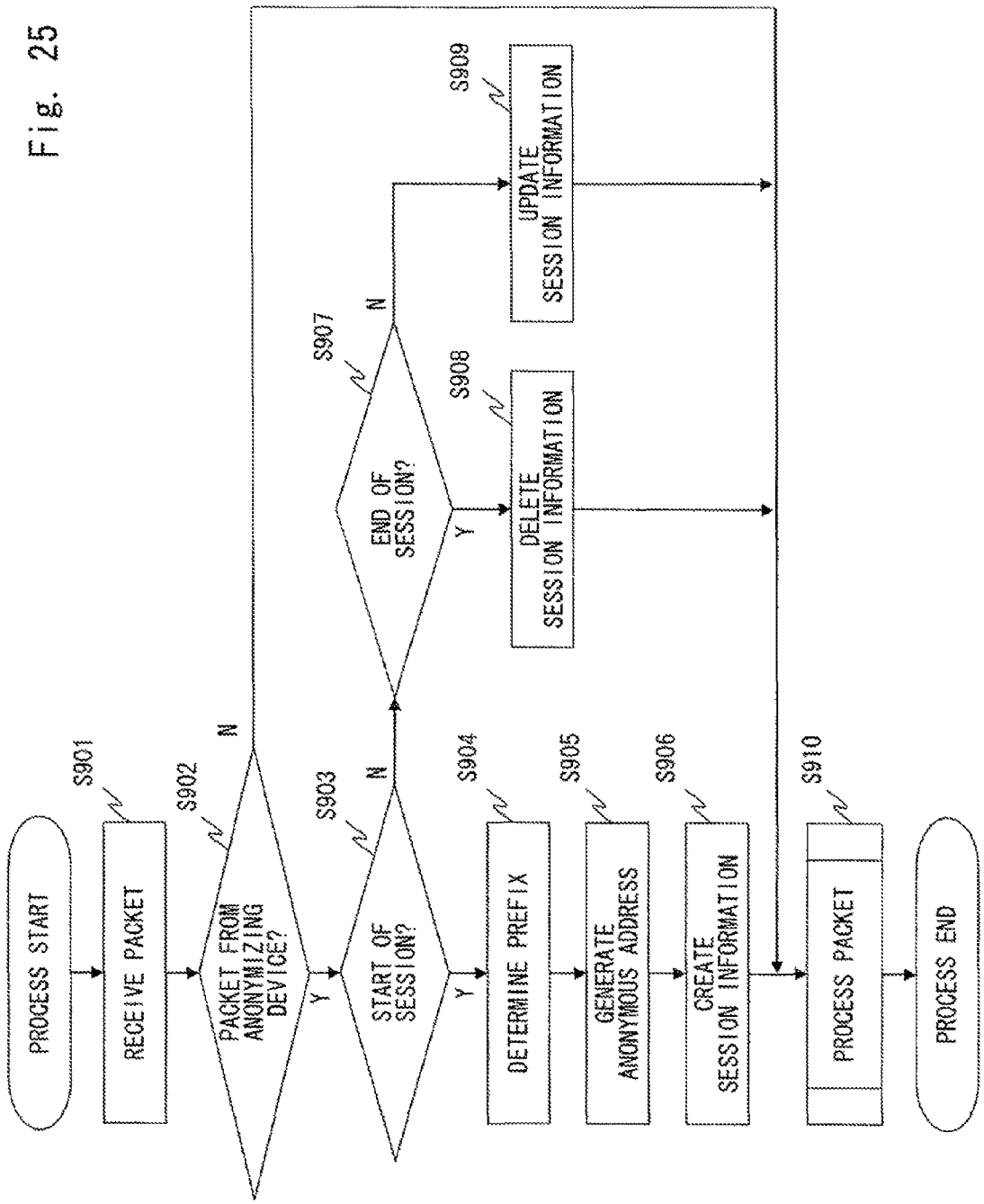
FIG. 25 is a view showing a configuration of the anchor server according to the second exemplary embodiment of the present invention.
Figure 26:
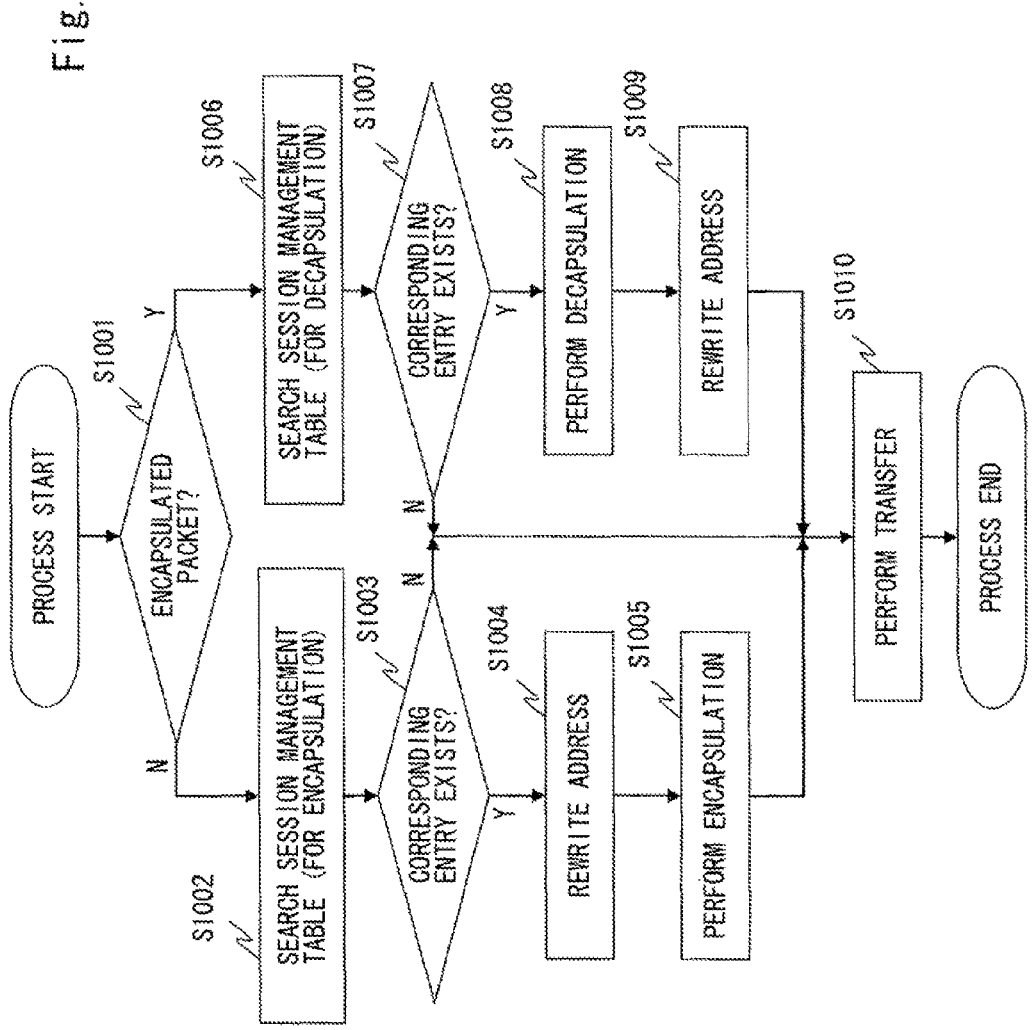
FIG. 26 is a flowchart showing an operation of a packet transfer process in the anchor server according to the second exemplary embodiment of the present invention.
Figure 27:
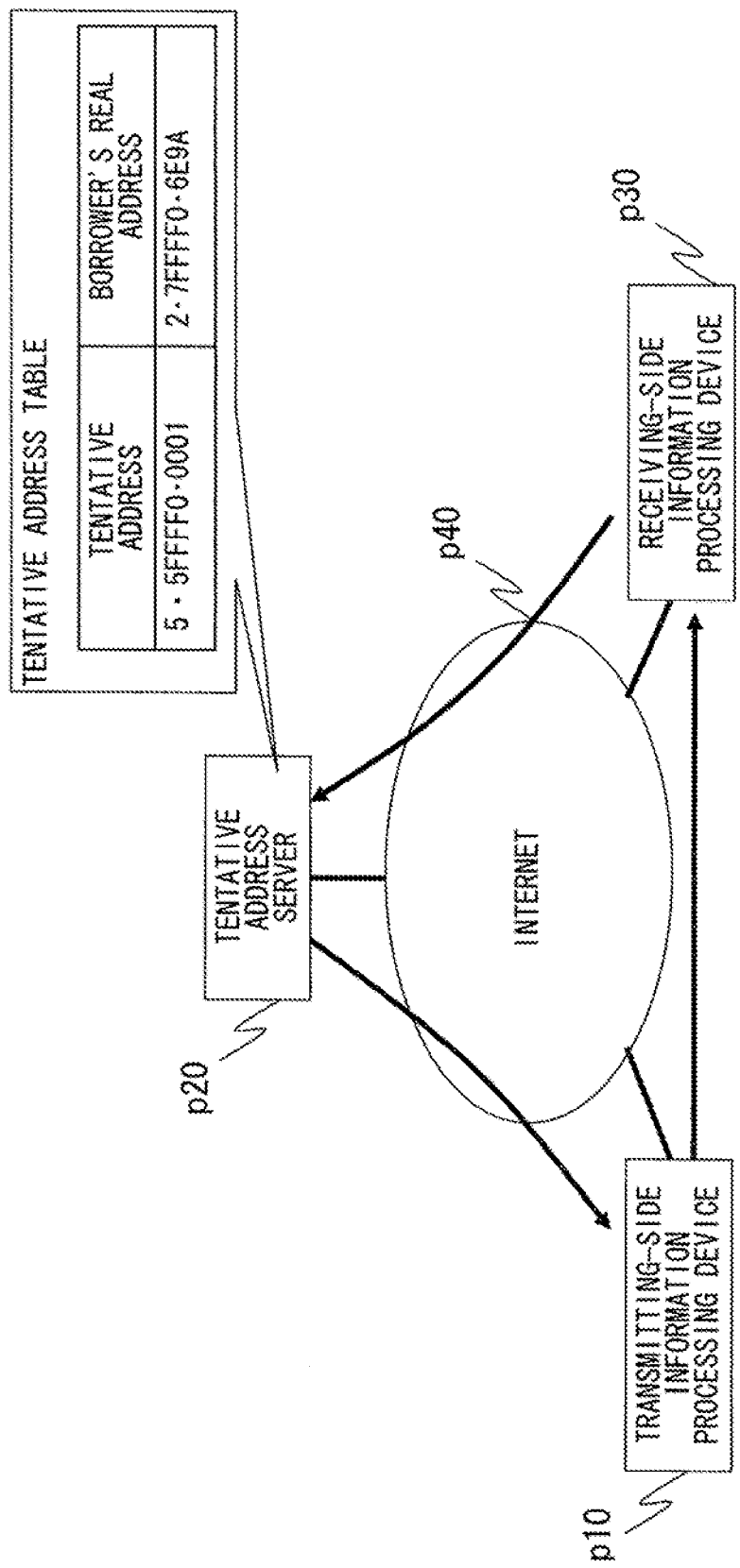
FIG. 27 is a view showing a configuration of a related communication system.

The operation of the communication system 1 according to the second exemplary embodiment is described hereinafter with reference to FIGS. 24 to 26. FIG. 24 is a flowchart showing the operation of the anonymizing device 101 when a packet is received from the communication node 300. FIGS. 25 and 26 are flowcharts showing the operation of the anchor server 201.

In FIG. 24, the anonymization control means 120_2 of the anonymizing device 101 first receives a packet transmitted from the communication node 300 through the interface 110A (Step S801). Then, the anonymity assurance necessity determination means 121 determines whether it is necessary to assure anonymity for the received packet (Step S802). When the anonymity is determined to be necessary (i.e., when "Y"), the process proceeds to Step S803. On the other hand, when the anonymity is determined not to be necessary to be assured (i.e., when "N"), the process proceeds to Step S809.

When the anonymity is determined to be necessary in Step S802, the session management means 122_2 checks the contents of the received packet and determines whether it is the start of a session (Step S803). Note that a method of determining the start of a session is the same as that described above, and explanation thereof is omitted. When it is determined to be the start of a session (i.e., when "Y"), the process proceeds to Step S804. On the other hand, when it is determined not to be the start of a session (i.e., when "N"), the process proceeds to Step S806.

When it is determined to be the start of a session in Step S803, the anchor selection means 125 selects the anchor server 201 to which rewriting of an address into an anonymous address is to be requested (Step S804).

Then, the session management means 122_2 creates a new entry in the session management table by using the address of the anchor server 201 selected by the anchor selection means 125 and the information for identifying a session acquired from the received packet in Step S801 (Step S805). After the processing in Step S805 ends, the process proceeds to Step S809.

Further, when it is determined not to be the start of a session in Step S803, the session management means 122_2 makes determination about the end of a session (Step S806). Note that a method of determining the end of a session is the same as that described above, and explanation thereof is omitted. When it is determined to be the end of a session (i.e., when "Y"), the process proceeds to Step S807. On the other hand, when it is determined not to be the end of a session (i.e., when "N"), the process proceeds to Step S808.

When it is determined to be the end of a session in Step S806, the session management means 122_2 performs processing at the end of the session (Step S807). Specifically, the session management means 122_2 deletes the corresponding entry from the session management table. After the processing in Step S807 ends, the process proceeds to Step S809.

Further, when it is determined not to be the end of a session in Step S806, the session management means 122_2 updates the expiration time in the session management table (Step S808). After the processing in Step S808 ends, the process proceeds to Step S809.

Finally, the packet processing means 130_2 refers to the information of the session management table and performs encapsulation for tunneling to the address of the anchor server 201 set to the corresponding entry in the session management table (Step S809).

Next, the operation of the anchor server 201 is described in detail with reference to FIGS. 25 and 26. FIG. 25 is a flowchart showing the operation of the anchor server 201 when the (encapsulated) packet transmitted from the anonymizing device 101 is received.

In FIG. 25, the anonymizing device determination means 260 of the anchor server 201 receives the packet transmitted from the anonymizing device 101 through the interface 210 (Step S901). Then, the anonymizing device determination means 260 determines whether the received packet is a packet transmitted from the anonymizing device 101 which is authorized to use the anchor server 201 (Step S902). Note that a method of determining the received packet is the same as that described above, and explanation thereof is omitted. When the received packet is determined to be a packet received from the authorized anonymizing device 101 (i.e., when "Y"), the process proceeds to Step S903. On the other hand, when the received packet is determined not to be a packet received from the authorized anonymizing device 101 (i.e., when "N"), the process proceeds to Step S910.

Next, when it is determined to be a packet received from the authorized anonymizing device 101 in Step S902, the session management means 271 checks the contents of the received packet and determines whether it is the start of a session (Step S903). When it is determined to be the start of a session (i.e., when "Y"), the process proceeds to Step S904. On the other hand, when it is determined not to be the start of a session (i.e., when "N"), the process proceeds to Step S907.

When it is determined to be the start of a session in Step S904, the anonymous address selection means 272 selects a prefix to be used when generating an anonymous address from the information of the prefix information table (FIG. 23) recorded in the information recording device 290 (Step S904).

Then, the anonymous address generation means 273 generates an anonymous address using the selected prefix and the IID key associated with the prefix (Step S905). Note that a method of generating an anonymous address is the same as that described above, and explanation thereof is omitted.

Then, the session management means 271 creates a new entry in the session management table by using the anonymous address and, the information for identifying a session acquired from the received packet in Step S901, and the address of the anonymizing device 101 from which the packet is transmitted (Step S906). After the processing in Step S906 ends, the process proceeds to Step S910.

Further, when it is determined not to be the start of a session in Step S903, the session management means 271 makes determination about the end of a session (Step S907). When it is determined to be the end of a session (i.e., when "Y"), the process proceeds to Step S908. On the other hand, when it is determined not to be the end of a session (i.e., when "N"), the process proceeds to Step S909.

When it is determined to be the end of a session in Step S907, the session management means 271 performs processing at the end of the session (Step S908). Specifically, the session management means 271 deletes the corresponding entry from the session management table. After the processing in Step S908 ends, the process proceeds to Step S910.

Further, when it is determined not to be the end of a session in Step S907, the session management means 271 updates the expiration time in the session management table (Step S909). After the processing in Step S909 ends, the process proceeds to Step S910.

Finally, the packet processing means 280 decapsulates the (encapsulated) packet transmitted from the anonymizing device 101, rewrites the source address into the anonymous address, and then transfers the packet to the destination address (Step S910). Note that the detail of the processing in Step S910 which is performed by the packet processing means 280 is described below with reference to FIG. 26.

Next, the detail of the processing in Step S910 of FIG. 25 is described hereinafter with reference to FIG. 26. FIG. 26 is a flowchart showing the operation of the processing which is performed by the packet processing means 280 of the anchor server 201. Note that the packet processing indicates processing that is performed on the (encapsulated) packet which is transmitted from the anonymizing device 101 and processed by the anonymization control means 270 or the packet addressed to the anonymous address which is received by the interface 210. The processing performed on the (encapsulated) packet which is transmitted from the anonymizing device 101 and processed by the anonymization control means 270 corresponds to the packet processing performed in Step S910 of FIG. 25.

In FIG. 26, the packet processing means 280 of the anchor server 201 first determines whether the received packet is encapsulated or not (Step S1001). When the received packet is determined to be encapsulated (i.e., when "Y"), the process proceeds to Step S1002. On the other hand, when the received packet is determined not to be encapsulated (i.e., when "N"), the process proceeds to Step S1006.

When the received packet is determined not to be encapsulated in Step S1001, the packet processing means 280 searches the session management table recorded in the information recording device 290 by using the information set to the received packet (S1002) and checks whether the corresponding entry exists (Step S1003). Note that the information compared when performing the search in Step S1002 is described earlier in the explanation of the packet processing means 280, and explanation thereof is omitted. When, as a result of checking in Step S1003, the corresponding entry is found (i.e., when "Y"), the process proceeds to Step S1004. On the other hand, when the corresponding entry is not found (i.e., when "N"), the process proceeds to Step S1010.

Then, when the corresponding entry is found in Step S1003, the packet processing means 280 rewrites the destination address of the received packet from the anonymous address to the source address of the found entry (Step S1004).

Then, the packet processing means 280 performs encapsulation of the packet whose destination address is rewritten in Step S1004 for transferring to the anonymizing device 101 (Step S1005). After the processing in Step S1005 ends, the process proceeds to Step S1010.

On the other hand, when the received packet is determined to be encapsulated in Step S1001, the packet processing means 280 searches the session management table recorded in the information recording device 290 by using the information set to the received packet (the encapsulated packet) (S1006) and checks whether the corresponding entry exists (Step S1007). Note that the information compared when performing the search in Step S1006 is described earlier in the explanation of the packet processing means 280, and explanation thereof is omitted. When, as a result of checking in Step S1007, the corresponding entry is found (i.e., when "Y"), the process proceeds to Step S1008. On the other hand, when the corresponding entry is not found (i.e., when "N"), the process proceeds to Step S1010.

Then, when the corresponding entry is found in Step S1007, the packet processing means 280 decapsulates the received packet (Step S1008). Specifically, the packet processing means 280 removes the external IP header of the received packet.

Then, the packet processing means 280 rewrites the source address of the decapsulated packet into the address recorded as the anonymous address in the session management table (Step S1009). After the processing in Step S1009 ends, the process proceeds to Step S1010.

Finally, the packet processing means 280 routes the packet using a common IP routing function, and sends out the packet to the network 600 from interface 210 (Step S1010).

Advantageous effects based on the communication system according to the present invention are described hereinbelow.

A first advantageous effect is to provide communication with assured anonymity to a communication node, which is a common IP node. The reason is that the anonymizing device rewrites the source address of a packet transmitted from the communication node (i.e., the address of the communication node) into an anonymous address and further tunnels the packet to the anchor server reachable using the prefix of the anonymous address, so that the entire address including the prefix part can be rewritten into the address with assured anonymity. Further, different anonymous addresses can be used from session to session.

A second advantageous effect is to provide a trace function that can identify the anonymizing device which has used an anonymous address from the anonymous address without the need to record every correspondence between the anonymous address and the address of the communication node by sharing private information (i.e. IID_key) with the anonymizing device. The reason is that the anonymous address generation means generates a part (IID part) of the anonymous address so that it can be converted to information for identifying the anonymizing device using the private information.

Further, the communication system according to the present invention is widely applicable to the communication system using IPv6. For example, the anchor server according to the present invention can be placed in an ISP (Internet Service Provider), and the function of the anonymizing device according to the present invention can be implemented in a CPE (Customer Premises Equipment) such as a broadband router that is located in a user's home who is a subscriber of the ISP. The ISP can thereby provide communication with assured anonymity to the user.

Further, in the communication system according to the present invention, when a server different from the ISP suffers unauthorized access using an anonymous address, provided that a log in which the anonymous address and the port number used for unauthorized access is notified to the ISP by an administrator of the server different from the ISP, the ISP can identify a user who made unauthorized access based on the anonymous address, thereby reducing adverse effects caused by anonymity. Because the provision of anonymity and the assurance of traceability in case of necessity can be both achieved, the application of the communication system according to the present invention is highly effective for ISP services and the like.

The present invention is not limited to the above-described exemplary embodiments, and various changes and modifications may be made therein without departing from the spirit and scope of the present invention.

This application is based upon and claims the benefit of priority from Japanese patent application No. 2009-052919 filed on Mar. 6, 2009 the disclosure of which is incorporated herein in its entirety by reference.

REFERENCE SIGNS LIST 100, 101 ANONYMIZING DEVICE
200, 201 ANCHOR SERVER
300 COMMUNICATION NODE
400 SERVER
500 LOCAL NETWORK
600 NETWORK
110A, 110B INTERFACE
120, 120_2 ANONYMIZATION CONTROL MEANS
121 ANONYMITY ASSURANCE NECESSITY DETERMINATION MEANS
122, 122_2 SESSION MANAGEMENT MEANS
123 ANONYMOUS ADDRESS SELECTION MEANS
124 ANONYMOUS ADDRESS GENERATION MEANS
130, 130_2 PACKET PROCESSING MEANS
140 INFORMATION RECORDING DEVICE
210 INTERFACE
220 PREFIX ASSIGNMENT MEANS
230 TRANSFER MEANS
240 PREFIX RECORDING DEVICE
250 TRANSFER INFORMATION RECORDING DEVICE
260 ANONYMIZING DEVICE DETERMINATION MEANS
270 ANONYMIZATION CONTROL MEANS
271 SESSION MANAGEMENT MEANS
272 ANONYMOUS ADDRESS SELECTION MEANS
273 ANONYMOUS ADDRESS GENERATION MEANS
280 PACKET PROCESSING MEANS
290 INFORMATION RECORDING DEVICE
p10 TRANSMITTING-SIDE INFORMATION PROCESSING DEVICE
p20 TENTATIVE ADDRESS SERVER
p30 RECEIVING-SIDE INFORMATION PROCESSING DEVICE
p40 INTERNET

The invention claimed is:

1. A communication system comprising an anonymizing device connected to a communication node through a first network, and a server connected to the anonymizing device through a second network, wherein
the anonymizing device comprises:
an anonymous address generation unit that generates an anonymous address based on a prefix acquired from the server; and
a packet processing unit that, upon receiving a packet transmitted from the communication node, rewrites a source address of the received packet into the anonymous address, encapsulates the received packet, and sends the encapsulated packet to the second network, using an address of the anonymizing device as a source address of the encapsulated packet and an address of the server as a destination address thereof, and the server comprises:
a transfer unit that, upon receiving the encapsulated packet transmitted from the anonymizing device, decapsulates the encapsulated packet and sends the decapsulated packet to the second network.

2. The communication system according to claim 1, wherein
the transfer unit of the server, upon receiving the packet with a destination address being the anonymous address, encapsulates the received packet, and sends the encapsulated packet to the second network, using an address of the server as a source address of the encapsulated packet and an address of the anonymizing device as a destination address thereof, and
the packet processing unit of the anonymizing device, upon receiving the encapsulated packet transmitted from the server, decapsulates the encapsulated packet, and sends the decapsulated packet to the first network, using an address of the communication node as a destination address of the decapsulated packet.

3. The communication system according to claim 1, wherein
the anonymizing device further comprises:
a session management unit that, upon receiving the packet transmitted from the communication node, identifies a session of the received packet and manages the identified session and the anonymous address in association with each other, and
the anonymous address generation unit of the anonymizing device generates an anonymous address based on the prefix acquired from the server and an interface ID varied from session to session.

4. The communication system according to claim 1, wherein
the anonymizing device further comprises:
an anonymous address selection unit that selects one prefix from a plurality of prefixes.

5. The communication system according to claim 4, wherein
when selecting one prefix from the plurality of prefixes, the anonymous address selection unit of the anonymizing device selects a prefix different from a prefix selected within a predetermined time period prior to the selection.

6. The communication system according to claim 4, wherein
when selecting one prefix from the plurality of prefixes, the anonymous address selection unit of the anonymizing device transmits a prefix assignment request signal to the server if a prefix unassigned for generation of the anonymous address does not exist, and
the server further comprises a prefix assignment unit that, upon receiving the prefix assignment request signal transmitted from the anonymizing device, assigns a prefix to the anonymizing device and transmits a prefix assignment response signal containing information of the assigned prefix to the anonymizing device.

7. The communication system according to claim 6, wherein
the prefix assignment request signal contains a prefix set number assigned to a prefix set composed of a plurality of prefixes acquired from the server.

8. The communication system according to claim 1, wherein
the anonymous address generation unit of the anonymizing device, upon receiving the packet transmitted from the communication node, creates an interface ID based on first interface ID creation information acquired from the server and an identifier of the anonymizing device, and generates the anonymous address based on the prefix acquired from the server and the created interface ID.

9. The communication system according to claim 8, wherein the anonymous address generation unit of the anonymizing device, upon receiving the packet transmitted from the communication node, creates second interface ID creation information based on the first interface ID creation information acquired from the server and a source port number of the packet transmitted from the communication node, and creates the interface ID based on the created second interface ID creation information and the identifier of the anonymizing device.

10. The communication system according to claim 1, wherein the anonymizing device further comprises:
an anonymity assurance necessity determination unit that, upon receiving the packet transmitted from the communication node, determines whether it is necessary to assure anonymity for the received packet.

11. A communication system comprising an anonymizing device connected to a communication node through a first network, and a server connected to the anonymizing device through a second network, wherein the anonymizing device comprises:
a packet processing unit that, upon receiving a packet transmitted from the communication node, encapsulates the received packet, and sends the encapsulated packet to the second network, using an address of the anonymizing device as a source address of the encapsulated packet and an address of the server as a destination address thereof, and the server comprises:
an anonymous address generation unit that generates an anonymous address based on a prefix; and
a packet processing unit that, upon receiving the encapsulated packet transmitted from the anonymizing device, decapsulates the encapsulated packet, rewrites a source address of the decapsulated packet into the anonymous address, and sends the decapsulated packet to the second network, using an address of the anonymizing device as the source address of the decapsulated packet.

12. The communication system according to claim 11, wherein the packet processing unit of the server, upon receiving the packet with a destination address being the anonymous address, rewrites the destination address of the received packet into an address of the communication node, encapsulates the received packet, and sends the encapsulated packet to the second network, using an address of the server as a source address of the encapsulated packet and an address of the anonymizing device as a destination address thereof, and the packet processing unit of the anonymizing device, upon receiving the encapsulated packet transmitted from the server, decapsulates the encapsulated packet, and sends the decapsulated packet to the first network.

13. The communication system according to claim 11, wherein the server further comprises:
a session management unit that, upon receiving the encapsulated packet transmitted from the anonymizing device, identifies a session of the received packet and manages the identified session and the anonymous address in association with each other, and the anonymous address generation unit of the server generates an anonymous address based on the prefix and an interface ID varied from session to session.

14. The communication system according to claim 11, wherein the server further comprises:
an anonymous address selection unit that selects one prefix from a plurality of prefixes.

15. The communication system according to claim 14, wherein when selecting one prefix from the plurality of prefixes, the anonymous address selection unit of the server selects a prefix different from a prefix selected within a predetermined time period prior to the selection.

16. The communication system according to claim 11, wherein the anonymous address generation unit of the server, upon receiving the encapsulated packet transmitted from the anonymizing device, creates an interface ID based on first interface ID creation information and an identifier of the anonymizing device, and generates the anonymous address based on the prefix and the created interface ID.

17. The communication system according to claim 16, wherein the anonymous address generation unit of the server, upon receiving the encapsulated packet transmitted from the anonymizing device, creates second interface ID creation information based on the first interface ID creation information and a source port number of the packet transmitted from the anonymous device, and creates the interface ID based on the created second interface ID creation information and the identifier of the anonymizing device.

18. The communication system according to claim 11, wherein the anonymizing device further comprises:
an anonymity assurance necessity determination unit that, upon receiving a packet transmitted from the communication node, determines whether it is necessary to assure anonymity for the received packet.

19. A communication method comprising:

upon receiving, by an anonymizing device, a packet transmitted from a communication node connected through a first network, generating, by the anonymizing device, an anonymous address based on a prefix acquired from a server connected to the anonymizing device through a second network;

rewriting, by the anonymizing device, a source address of the received packet into the anonymous address, encapsulating the received packet, and sending the encapsulated packet to the second network, using an address of the anonymizing device as a source address of the encapsulated packet and an address of the server as a destination address thereof; and upon receiving, by a server, the encapsulated packet transmitted from the anonymizing device, decapsulating the encapsulated packet, and transferring the decapsulated packet to the second network.

20. The communication method according to claim 19, wherein when the server decapsulates the encapsulated packet and transfers the decapsulated packet to the second network, upon receiving the packet with a destination address being the anonymous address, encapsulates the received packet, and sends the encapsulated packet to the second network, using an address of the server as a source address of the encapsulated packet and an address of the anonymizing device as a destination address thereof, and when the anonymizing device sends the packet, upon receiving the encapsulated packet transmitted from the server, decapsulates the encapsulated packet, and sends the decapsulated packet to the first network, using an address of the communication node as a destination address of the decapsulated packet.

21. A communication method comprising:

upon receiving, by an anonymizing device, a packet transmitted from a communication node connected through a first network, encapsulating the received packet, and sending the encapsulated packet to a second network connecting the anonymizing device and a server, using an address of the anonymizing device as a source address of the encapsulated packet and an address of the server as a destination address thereof;

connecting by a server to the anonymizing device through a second network, upon receiving the encapsulated packet transmitted from the anonymizing device, generating, by the server, an anonymous address based on a prefix; and decapsulating, by the server, the encapsulated packet, rewriting a source address of the decapsulated packet into the anonymous address, and sending the decapsulated packet to the second network, using an address of the anonymizing device as the source address of the decapsulated packet.

22. The communication method according to claim 21, wherein when the server sends the packet, upon receiving the packet with a destination address being the anonymous address, rewrites the destination address of the received packet into an address of the communication node, encapsulates the received packet, and sends the encapsulated packet to the second network, using an address of the server as a source address of the encapsulated packet and an address of the anonymizing device as a destination address thereof, and when the anonymizing device sends the packet, upon receiving the encapsulated packet transmitted from the server, decapsulates the encapsulated packet and sends the decapsulated packet to the first network.

23. An anonymizing device comprising:

an anonymous address generation unit that generates an anonymous address based on a prefix acquired from a server connected through a second network upon receiving a packet transmitted from a communication node connected through a first network; and a packet processing unit that rewrites a source address of the packet transmitted from the communication node into the anonymous address, encapsulates the packet, and sends the encapsulated packet to the second network, using an address of the anonymizing device as a source address of the encapsulated packet and an address of the server as a destination address thereof.

24. A server comprising:

an anonymous address generation unit that generates an anonymous address based on a prefix upon receiving a packet transmitted from a communication node connected to an anonymizing device through a first network, the packet being encapsulated by the anonymizing device and transmitted through a second network; and a packet processing unit that decapsulates the encapsulated packet transmitted from the anonymizing device, rewrites a source address of the decapsulated packet into the anonymous address, and sends the decapsulated packet to the second network, using an address of the anonymizing device as the source address of the decapsulated packet.

25. A communication system comprising an anonymizing device connected to a communication node through a first network, and a server connected to the anonymizing device through a second network, wherein the anonymizing device comprises:

a packet processing unit that, upon receiving a packet transmitted from the communication node, rewrites a source address of the received packet into an anonymous address acquired from the server, encapsulates the received packet, and sends the encapsulated packet to the second network, using an address of the anonymizing device as a source address of the encapsulated packet and an address of the server as a destination address thereof, and the server comprises:

a transfer unit that, upon receiving the encapsulated packet transmitted from the anonymizing device, decapsulates the encapsulated packet and sends the decapsulated packet to the second network.

26. An anonymizing device comprising:

a packet processing unit that, upon receiving a packet transmitted from a communication node connected through a first network, acquires an anonymous address from a server connected through a second network, rewrites a source address of the packet transmitted from the communication node into the acquired anonymous address, encapsulates the packet, and sends the encapsulated packet to the second network, using an address of the anonymizing device as a source address of the encapsulated packet and an address of the server as a destination address thereof.

* * * * *